(12) United States Patent
Chung et al.

(10) Patent No.: US 8,654,666 B2
(45) Date of Patent: Feb. 18, 2014

(54) COMMUNICATION METHOD AND APPARATUS IN MULTI-CARRIER SYSTEM

(75) Inventors: Jae Hoon Chung, Gyeongki-do (KR); Min Seok Noh, Gyeongki-do (KR); Yeong Hyeon Kwon, Gyeongki-do (KR); Seung Hee Han, Gyeongki-do (KR); So Yeon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 13/127,124

(22) PCT Filed: Nov. 3, 2009

(86) PCT No.: PCT/KR2009/006431
§ 371 (c)(1),
(2), (4) Date: May 2, 2011

(87) PCT Pub. No.: WO2010/062061
PCT Pub. Date: Jun. 3, 2010

(65) Prior Publication Data
US 2011/0211489 A1 Sep. 1, 2011

Related U.S. Application Data

(60) Provisional application No. 61/110,932, filed on Nov. 3, 2008, provisional application No. 61/151,845, filed on Feb. 12, 2009, provisional application No. 61/157,910, filed on Mar. 6, 2009.

(51) Int. Cl.
*H04J 1/16* (2006.01)
(52) U.S. Cl.
USPC .......................................................... 370/252
(58) Field of Classification Search
USPC .......................................................... 370/252
See application file for complete search history.

(56) References Cited

U.S. PATENT DOCUMENTS

| 2006/0078075 | A1 | 4/2006 | Stamoulis et al. |
| 2007/0297323 | A1* | 12/2007 | Seki .............................. 370/208 |
| 2010/0329384 | A1* | 12/2010 | Kwak et al. ................... 375/295 |
| 2011/0103333 | A1* | 5/2011 | Berggren et al. ............. 370/329 |
| 2011/0134861 | A1* | 6/2011 | Seo et al. ...................... 370/329 |
| 2012/0320834 | A1* | 12/2012 | Branlund et al. ............. 370/328 |

FOREIGN PATENT DOCUMENTS

| KR | 10-0228683 | 8/1999 |
| KR | 10-0606112 | 7/2006 |

OTHER PUBLICATIONS

International Search Report from PCT/KR2009/006431 (PCT corresponding to present application).

* cited by examiner

*Primary Examiner* — Mark Rinehart
*Assistant Examiner* — Christopher R Crompton
(74) *Attorney, Agent, or Firm* — Morgan, Lewis & Bockius LLP

(57) ABSTRACT

Disclosed is a communication method in a multi-carrier system, including: allocating radio resources for transmitting signals to a middle guard band; and transmitting the signals through the radio resources; wherein the middle guard band is a frequency band positioned between used bands of a plurality of carriers, respectively, within an aggregated carrier formed by aggregating the plurality of carriers and a unit allocating the radio resources of the middle guard band is different from a unit allocating the radio resources of the used bands. A multi-carrier system uses the guard bands between the carriers to improve channel estimation performance or increase efficiency of radio resources.

8 Claims, 41 Drawing Sheets

COMMUNICATION METHOD AND APPARATUS IN MULTI-CARRIER SYSTEM

The present application is a national stage of PCT International Application No. PCT/KR2009/006431, filed Nov. 3, 2009, and claims the benefit of U.S. Provisional Application Nos. 61/110,932, filed Nov. 3, 2008, 61/151,845, filed Feb. 12, 2009, and 61/157,910, filed Mar. 6, 2009.

TECHNICAL FIELD

The present invention relates to wireless communications, and more particularly, to a communication method and apparatus in a wireless communications system capable of supporting multi-carrier.

BACKGROUND ART

A wireless communication system has been prevalently developed in order to provide various kinds of communication services such as voice, data, or the like. Generally, the wireless communication system is a multiple access system that may share available system resources (bandwidth, transmission power, or the like) to support communication with multiple users. Examples of a multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, or the like.

The wireless communication system generally uses a single bandwidth so as to transmit data. For example, a second-generation wireless communication system uses a bandwidth 200 KHz to 1.25 MHz and a third-generation wireless communication system uses bandwidth of 5 MHz to 10 MHz. In order to support the increasing transmission capacity, the latest 3GPP LTE or 802.16m continues to extend its own bandwidth of up to 20 MHz or more. In order to increase the transmission capacity, it is essential to increase a bandwidth. However, even when the required level of services is low, increasing the bandwidth may greatly increase power consumption.

Therefore, a multi-carrier system to define carriers having a single bandwidth and a central frequency and transmit and/or receive data in a wide band through a plurality of carriers has been emerged. The multi-carrier system simultaneously supports a narrow band and a wide band by using one or more carriers. For example, when a single carrier corresponds to a bandwidth of 20 MHz, the multi-carrier system supports a bandwidth of 40 MHz by using two carriers.

Generally, a guard band is disposed between carriers in the multi-carrier system. Generally, the guard band is a null region that does not transmit any data. If the guard bands between contiguous carriers can be used, additional radio resources may be secured. A need exists for a method capable of using the guard band in the multi-carrier system.

DISCLOSURE

Technical Problem

The present invention has been made in an effort to provide a communication method and apparatus using a guard band between carriers in a multi-carrier system.

Technical Solution

In an aspect, there is provided a communication method in a multi-carrier system, including: allocating radio resources for transmitting signals to a middle guard band; and transmitting the signals through the radio resources, wherein the middle guard band is a frequency band positioned between used bands of a plurality of carriers, respectively, within an aggregated carrier formed by aggregating the plurality of carriers and the radio resource allocation unit of the middle guard band is different from the radio resource allocation unit of the used bands.

In another aspect, there is provided a communication method in a multi-carrier system, including: allocating radio resources for transmitting signals to a middle guard band; and transmitting the signals through the radio resources, wherein the middle guard band is a frequency band positioned between used bands of a plurality of carriers, respectively, within an aggregated carrier formed by aggregating the plurality of carriers and a radio resource allocation unit of the middle guard band is the same as a radio resource allocation unit of the used bands.

In still another aspect, there is provided user equipment, including: a radio frequency (RF) unit that transmits and receives radio signals; a processor that is connected to the RF unit, wherein the processor receives signals in a middle guard band and performs channel estimation of carriers based on the signals, the middle guard band being a frequency band positioned between used bands of a plurality of carriers, respectively, within an aggregated carrier formed by aggregating the plurality of carriers.

Advantageous Effects

As set forth above, the exemplary embodiment of the present invention uses the guard band between the carriers in the multi-carrier system to improve the channel estimation performance or the use efficiency of the radio resources.

MODE FOR INVENTION

The following technologies may be used for various radio access systems such as a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, or the like. The CDMA may be implemented by radio technologies, such as universal terrestrial radio access (UTRA), CDMA 2000, or the like. The TDMA may be implemented by radio technologies, such as global system for mobile communications (GSM)/general packet radio service (GPRS)/enhanced data rates for GSM evolution (EDGE), or the like. The OFDMA may be implemented by radio technologies, such as IEEE 802.11 (Wi-Fi), IEEE 802.16 (WiMAX), IEEE 802-20, evolved-UTRA (E-UTRA), or the like. The UTRA is a portion of a universal mobile telecommunications system (UMTS). The 3rd generation partnership project (3GPP) long term evolution (LTE), which is a portion of evolved UMTS (E-UMTS) using the E-UTRA, adopts the OFDMA in downlink and adopts the SC-FDMA in uplink. LTE-A (Advanced) is evolved from the 3GPP LTE.

For clear description, exemplary embodiments of the present invention mainly describes the 3 GPP LTE/LET-A but the technical feature of the present invention is not limited thereto.

Figure 1:
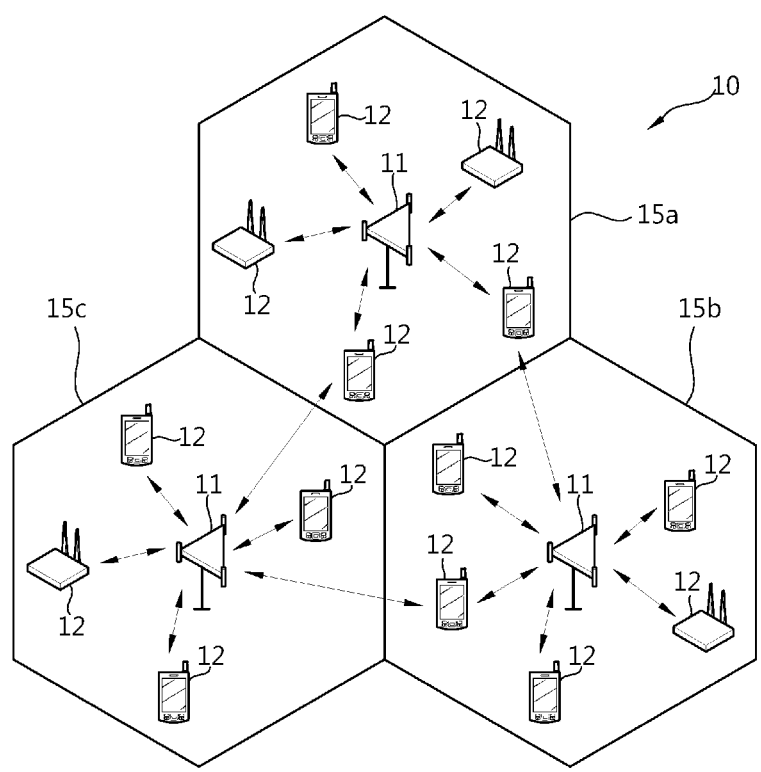
FIG. 1 is a diagram showing a wireless communication system.

FIG. 1 is a diagram showing a wireless communication system. A wireless communication system 10 includes at least one base station (BS) 11. Each base station 11 provides communication services to specific geographical areas (generally, referred to as a cell) 15a, 15b, and 15c. The cells may be again divided into a plurality of regions (referred to as a sector). User equipment (UE) 12 may be fixed or have mobility and may be referred to as other terms, such as a mobile station (MS), a user terminal (UT), a subscriber station (SS), wireless devices, personal digital assistants (PDAs), wireless modems, handheld devices, or the like. The base station 11 is generally referred to as a fixed station that communicates with the user equipment 12 and may be referred to as other terms such as evolved-Node B (eNB), a base transceiver system (BTS), an access point, or the like.

Hereinafter, a downlink (DL) means communication from the base station to the user equipment and an uplink (UL) means communication from the user equipment to the base station. In the downlink, a transmitter may be a portion of the base station and a receiver may be a portion of the user equipment. In the uplink, the transmitter may be a portion of the user equipment and the receiver may be a portion of the base station.

Figure 2:
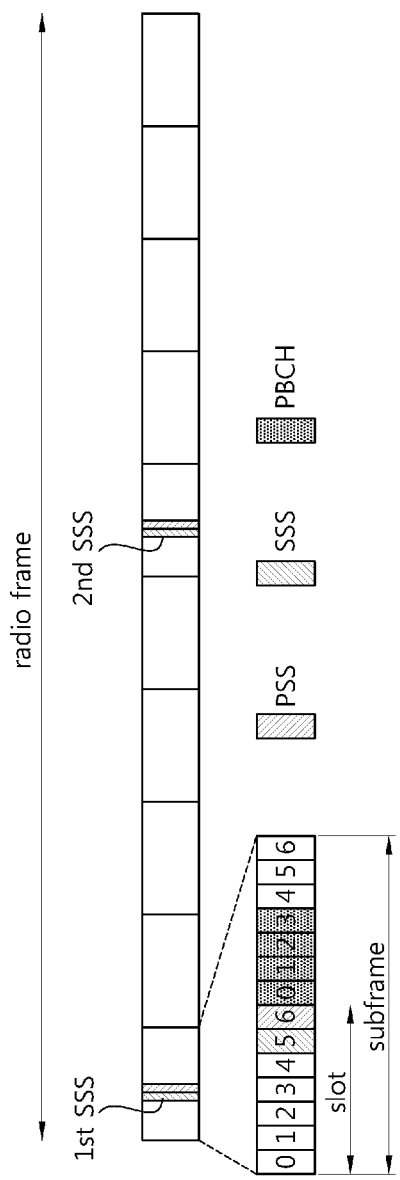
FIG. 2 is a diagram showing a structure of a radio frame in 3GPP LTE.

FIG. 2 shows a structure of a radio frame in the 3GPP LTE. This may refer to section 6 of 3GPP TS 36.211 V8.4.0 (2008-09). A radio frame is configured to include 10 subframes and a single subframe is configured to include two slots. The time to transmit the single subframe may be referred to as transmission time interval (TTI). For example, a length of a single subframe may be 1 ms and a length of one slot may be 0.5 ms.

One slot may include a plurality of orthogonal frequency division multiplexing (OFDM) symbols in a time domain. The OFDM symbol, which is to represent one symbol period since the 3GPP LTE uses the OFDMA in the downlink, may be referred to as other names according to multiple access methods. For example, when the SC-FDMA is used as an uplink multiple access method, the OFDM symbol may be referred to as the SC-FDMA symbol. Although a case in which one slot include 7 OFDM symbols is exemplarily described, the number of OFDM symbols included in one slot may be changed according to a length of cyclic prefix (CP). According to the 3GPP TS 36.211, a single subframe includes 7 OFDM symbols at a normal CP and a single subframe includes 6 OFDM symbols at an extended CP. The structure of the radio frame is only an example and the number of subframes and the number of slots included in the subframe may be variously changed.

A primary synchronization signal (PSS) is transmitted at the final OFDM symbols of a first slot and an eleventh slot that are included in the radio frame. The PSS is used to obtain OFDM symbol synchronization or slot synchronization and is associated with physical cell identity (ID). A primary synchronization code (PSC) is a sequence used for the PSS and the 3GPP LTE has three PSCs and transmits one of three PSCs as the PSS according to the cell ID. Each of the final OFDM symbols of the first slot and the eleventh slot uses the same PSC.

A secondary synchronization signal (SSS) includes a first SSS and a second SSS. The first SSS and the second SSS are transmitted at OFDM symbols contiguous to the OFDM symbol transmitted by the PSS. The SSS is used to obtain the frame synchronization. The SSS is used to obtain the cell ID, together with the PSS. The first SSS and the second SSS use different secondary synchronization codes (SSCs). When each of the first SSS and the second SSS includes 31 subcarriers, each of two SSCs having a length of 31 is used for the first SSS and the second SSS.

A physical broadcast channel (PBCH) is transmitted at previous four OFDM symbols of a second slot of a first subframe of the radio frame. The PBCH carries system information essential to communicate the user equipment with the base station and the system information transmitted through the PBCH may be referred to as a master information block (MIB). The system information transmitted through a physical downlink control channel (PDCCH) may be referred to as system information blocks (SIB).

Figure 3:
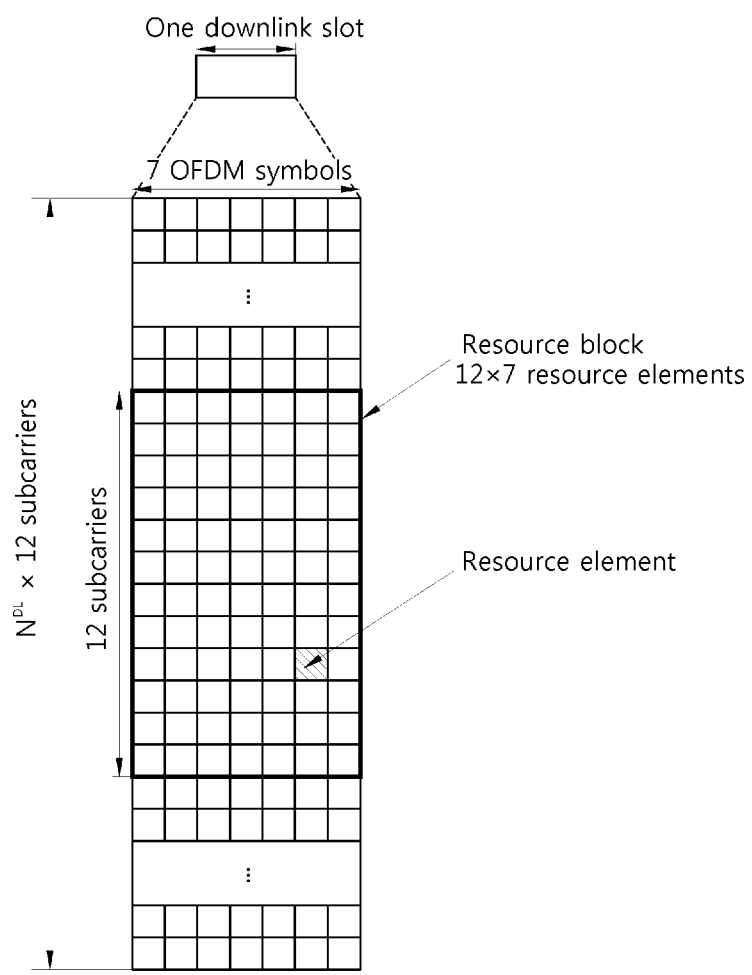
FIG. 3 is an exemplified diagram showing a resource grid for a single downlink slot.

FIG. 3 exemplarily shows a resource grid for a single downlink slot. The downlink slot includes a plurality of OFDM symbols in a time domain. Here, a case in which a single downlink slot includes the 7 OFDM symbols and a single resource blocks includes 12 subcarriers in the frequency domain is exemplarily described, but is not limited thereto. Each element on the resource grid may be referred to as a resource element and the single resource block includes 12×7 resource elements. The number $N^{DL}$ included in the downlink slot depends on a downlink transmission bandwidth configured in the cell.

Figure 4:
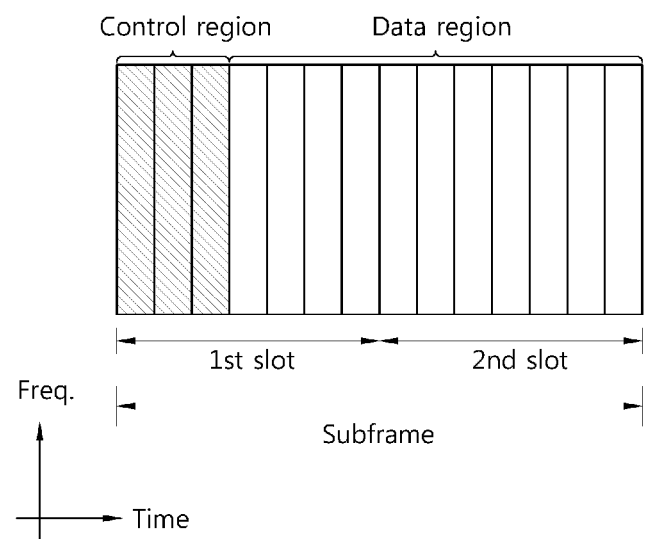
FIG. 4 is a diagram showing a structure of a downlink subframe.

FIG. 4 shows a structure of the downlink subframe. The subframe includes two slots in the time domain. The maximum previous 3 OFDM symbols of the first slot within the subframe are a control region to which control channels are allocated and the remaining OFDM symbols are a data region to which a physical downlink shared channel is allocated.

An example of the downlink control channels used in the 3 GPP LTE may include a physical control format indicator channel (PCFICH), a physical downlink control channel (PDCCH), a physical hybrid-ARQ indicator channel (PHICH), or the like. The PCFICH transmitted at the first OFDM symbol of the subframe carries information on the number of OFDM symbols (that is, a size of a control region) used to transmit the control channels within the subframe. The control information transmitted through the PDCCH is referred to as downlink control information (DCI). The DCI indicates uplink resource allocation information, downlink resource allocation information, an uplink transmission power control command for any UE groups, or the like. The PHICH carries acknowledgement (ACK)/not-acknowledgement (NACK) signals for an uplink hybrid automatic repeat request (HARQ). That is, the ACK/NACK signal for uplink data transmitted by the user equipment is transmitted to the PHICH.

The following table indicates the DCI according to a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates the uplink resource allocation information (or, referred to as an uplink grant), DCI formats 1, 1A, 1B, 1C, 1D, 2 and 2A indicate the downlink resource allocation information (or, referred to as downlink grant), and DCI formats 3 and 3A indicate an uplink transmit power control (TPC) command for any UE groups.

The following table indicates information elements included in DCI format 0 that is the uplink grant. Each information element may refer to section 5.3.3.1 of 3GPP TS 36.212 V8. 4.0 (2008-09) entitled "Technical Specification Group Radio Access Network; Evolved Universal Terrestrial Radio Access (E-UTRA); Multiplexing and channel coding (Release 8)".

TABLE 2

- Flag for format0/format1A differentiation - 1 bit
- Hopping flag - 1 bit
- Resource block assignment and hopping resource allocation -
  $\lceil \log_2(N_{RB}^{UL}(N_{RB}^{UL} + 1)/2) \rceil$ bits
  - For PUSCH hopping:
    - $N_{UL\_hop}$ bits are used to obtain the value of $\tilde{n}_{PRB}(i)$
    - ($\lceil \log_2(N_{RB}^{UL}(N_{RB}^{UL} + 1)/2) \rceil$) - $N_{UL\_hop}$) bits provide the resource allocation of the first slot in the UL subframe TABLE 2-continued

Figure 5:
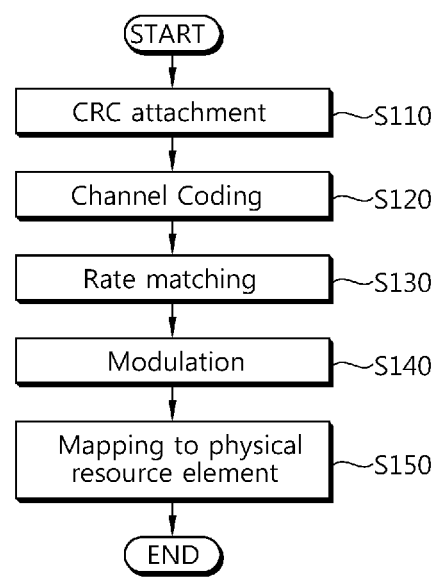
FIG. 5 is a flow chart showing a configuration of PDCCH.

- For non-hopping PUSCH:
  - ($\lceil \log_2(N_{RB}^{UL}(N_{RB}^{UL} + 1)/2) \rceil$) bits provide the resource allocation of the first slot in the UL subframe
- Modulation and coding scheme and redundancy version - 5 bits
- New data indicator - 1 bit
- TPC command for scheduled PUSCH - 2 bits
- Cyclic shift for DM RS - 3 bits
- UL index (2 bits, this field just applies to TDD operation)
- CQI request - 1 bit FIG. 5 shows a flow chart showing a configuration of the PDCCH. At step S110, the base station determines the PDCCH format to be transmitted to the user equipment according to the DCI and a cyclic redundancy check (CRC) is attached to the control information. A unique identifier (referred to as radio network temporary identifier (RNTI)) is masked on the CRC according to owner or usage of the PDCCH. When being determined the PDCCH for a specific user equipment, the unique identifier of the user equipment, for example, a cell-RNTI (C-RNTI) may be masked to the CRC. When being determined as the PDCCH for a paging message, a paging indication identifier, for example, a paging-RNTI (P-RNTI) may be masked to the CRC. When being determined as the PDCCH for the system information, a system information identifier, that is, a system information-RNTI (SI-RNTI) may be masked to the CRC. In order to indicate a random access response that is a response for transmission of a random access preamble of the user equipment, a random access-RNTI (RA-RNTI) may be masked to the CRC. The following Table 3 indicates an example of identifiers masked to the PDCCH.

TABLE 3

| Type | Identifier | Description |
| --- | --- | --- |
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe or PRACH slot index for UE PRACH transmission). |
|  | TPC-RNTI | used for uplink transmit power control command (It could be differentiated according to the index of UE TPC group). |

When the C-RNTI is used, the PDCCH carries the control information for the corresponding specific UE, that is, the UE-specific control information and when other RNTIs are used, the PDCCH carries common control information received by all the or the plurality of user equipments within the cell.

At step S120, the DCI to which the CRC is added is performed channel coding to generate coded data. At step S130, transmission rate matching is performed according to the number of CCE allocated to the PDCCH format. At step S140, the coded data are modulated to generate modulated symbols. At step S150, the modulated symbols are mapped to the physical resource elements.

A plurality of PDCCHs may be transmitted within the single subframe. The user equipment monitors the plurality of PDCCHs for each subframe. In this case, the monitoring means the attempt of decoding each PDCCH according to the PDCCH format monitored by the user equipment. In the control region allocated within the subframe, the base station does not provide the information where is the PDCCH corresponding to the user equipment. The user equipment monitors a set of PDCCH candidates within the subframe to find its own PDCCH. This is referred to as blind decoding. For example, when the CRC error is not detected by the demasking of the C-RNTI of the PDCCH at the corresponding PDCCH, the user equipment is detected as the PDCCH having its own DCI.

A space to search the PDCCH within the control region is referred to as a search space. A set of the PDCCH candidates monitored is defined according to the search spaces. When a set of all the CCEs for the PDCCH within a single subframe is referred to as a CCE set, the search spaces are a set of contiguous CCEs that starts at a specific start point within the CCE set according to CCE aggregation levels. The CCE aggregation levels are a CCE unit for searching the PDCCH and the size thereof is defined as the number of contiguous CCEs. The CCE aggregation level means the number of CCEs used to transmit the PDCCH. Each search space is defined according to the CCE aggregation levels. The position of the PDDCH candidates is generated for the size of each CCE aggregation level within the search spaces.

The search space may be classified into a common search space and a UE-specific search space. The common search space is monitored by all the user equipments within the cell and the user equipment-specific search space is monitored by the specific user equipment. The user equipment monitors the common search space and/or the user equipment-specific search space according to the control information to be received. The number of CCE aggregation levels supported by the common search space is smaller than the number of the CCE aggregation level supported by the user equipment-specific search space. The common search space and the user equipment-specific space may overlap each other.

In order to receive the downlink data, the user equipment first receives the downlink resource allocation to the PDCCH. When the detection of the PDCCH succeeds, the user equipment reads the DCI on the PDCCH. The downlink data on the PDSCH are received using the downlink resource allocation within the DCI. Further, in order to transmit the uplink data, the user equipment first receives the uplink resource allocation to the PDCCH. When the detection of the PDCCH succeeds, the user equipment reads the DCI on the PDCCH. The uplink data are transmitted to the PUSCH by using the uplink resource allocation within the DCI.

Figure 6:
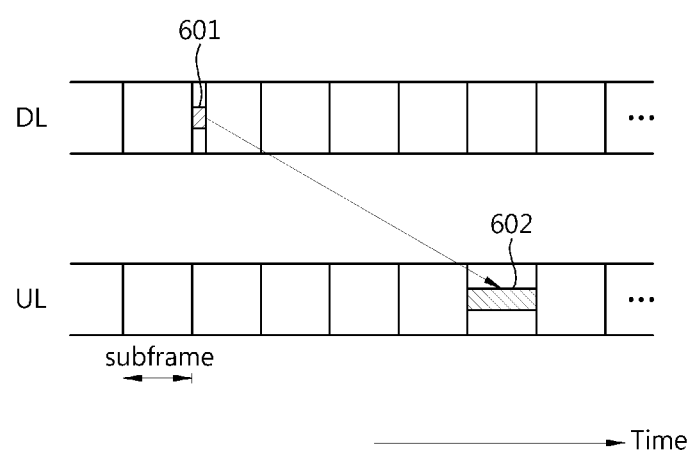
FIG. 6 is an exemplified diagram showing a transmission of uplink data.

FIG. 6 exemplarily shows the transmission of the uplink data. The user equipment transmits the uplink data to a PUSCH 602 that is indicated by a PDCCH 601. The user equipment monitors the PDCCH 601 in the downlink subframe to receive the uplink resource allocation, that is, DCI format 0 on the PDCCH 601. The user equipment transmits the uplink data to the PUSCH 602 configured based on the uplink resource allocation.

Figure 7:
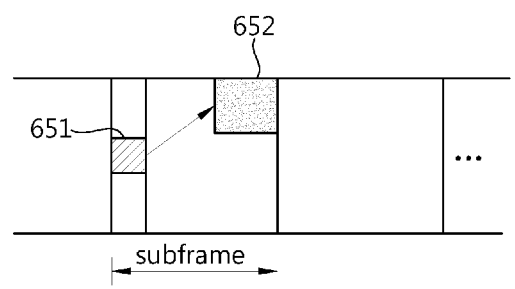
FIG. 7 is an exemplified diagram showing a reception of downlink data.

FIG. 7 exemplarily shows a reception of downlink data. The user equipment receives the downlink data on a PDSCH 652 that is indicated by a PDCCH 651. The user equipment monitors the PDCCH 651 in the downlink subframe to receive the downlink resource allocation information. The user equipment receives the downlink data on the PDSCH 652 that is indicated by the downlink resource allocation information.

The wireless communication system may be a multi-carrier system.

The existing 3GPP LTE system supports the case in which the downlink bandwidth and the uplink bandwidth are set to be different from each other, which is the basis of a single carrier. That is, the 3GPP LTE system means supporting only the case in which the bandwidth of the downlink and the bandwidth of the uplink are different from each other under the condition that the single carrier for each of the downlink and the uplink is defined. For example, the 3GPP LTE system may support maximum 20 MHz and have different uplink bandwidth and downlink bandwidth, but supports only the single carrier in the uplink and the downlink.

On the other hand, the multi-carrier system supports the carrier aggregation. The carrier aggregation means configuring a wide band by aggregating a plurality of narrow band carriers. The carrier aggregation may support a throughput increased through the extension of the transmission bandwidth, prevent the increase of cost due to the introduction of a wide band radio frequency (RF) element, and secure the compatibility with the existing system. Extending the transmission bandwidth may support the bandwidth of maximum 100 MHz when five carriers as granularity in a carrier unit having, for example, a bandwidth of 20 MHz are allocated.

The carrier aggregation may be classified into the aggregation of contiguous carriers that is performed between continuous carriers in a frequency domain and the aggregation of non-contiguous carriers that is performed between discontinuous carriers. The aggregation of non-contiguous carriers can be named as spectrum aggregation.

The number of carriers aggregated between the downlink and the uplink and/or the bandwidth of the carriers may be set to be different. The case in which the number of downlink carriers and the number of uplink carriers are the same may be referred to as symmetric aggregation and the case in which the number of downlink carriers and the number of uplink carriers are different from each other may be referred to as asymmetric aggregation. Alternatively, the case in which the bandwidth of the downlink carriers and the bandwidth of the uplink carriers are the same may be referred to as symmetric aggregation and the case in which the bandwidth of the downlink carriers and the bandwidth of the uplink carriers are different from each other may be asymmetric aggregation.

The bandwidth of the carriers used for the carrier aggregation may be the same or may be different from each other For example, for the configuration of 40 MHz band, two carriers of 20 MHz may be used. Alternatively, for the configuration of 40 MHz band, a single carrier of 20 MHz and two carriers of 10 MHz may be used.

Hereinafter, a multi-carrier system means a system that may support a plurality of carriers based on the carrier aggregation. In the multi-carrier system, the aggregation of contiguous carriers and/or the aggregation of non-contiguous carriers may be used and either of the symmetric aggregation or the non-symmetric aggregation may be used. Different radio access technologies (RATs) may be applied to each carrier. For example, the 3GPP LTE may be applied to first and second carriers and IEEE 802.16 or the 3GPP LTE-A may be applied to a third carrier.

Figure 8:
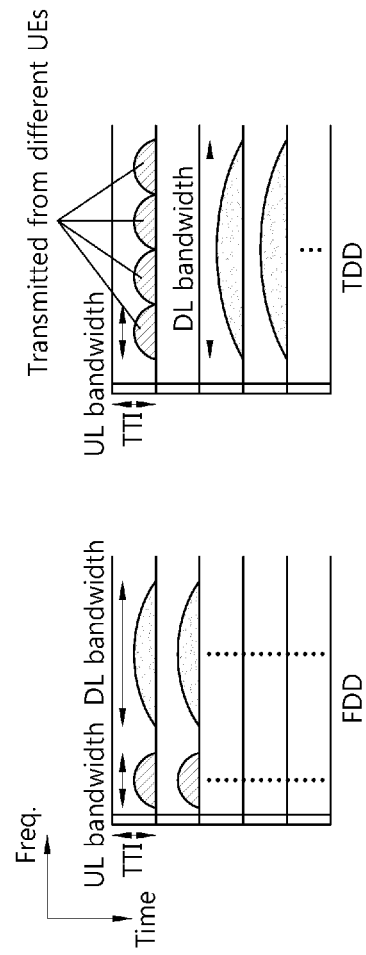
FIG. 8 is a diagram showing an example of a structure in which uplink/downlink bandwidths in frequency division duplex (FDD) and time division duplex (TDD) are asymmetrically constructed, in a multi-carrier system.

FIG. 8 shows an example of a structure in which the uplink/downlink bandwidths in the frequency division duplex (FDD) and the time division duplex (TDD) are asymmetrically constructed, in a multi-carrier system. The FDD means that the uplink transmission and the downlink transmission are performed in different frequency bands and the TDD means that the uplink transmission and the downlink transmission are performed in different TTI (or, time slot, subframe). In the FDD, the case in which the downlink bandwidth is larger than the uplink bandwidth is shown, but the uplink bandwidth may be larger than the downlink bandwidth. Each bandwidth may use the plurality of carriers. In the TDD, the case in which the uplink bandwidth uses four carriers and the downlink bandwidth uses a single carrier is shown.

Figure 9:
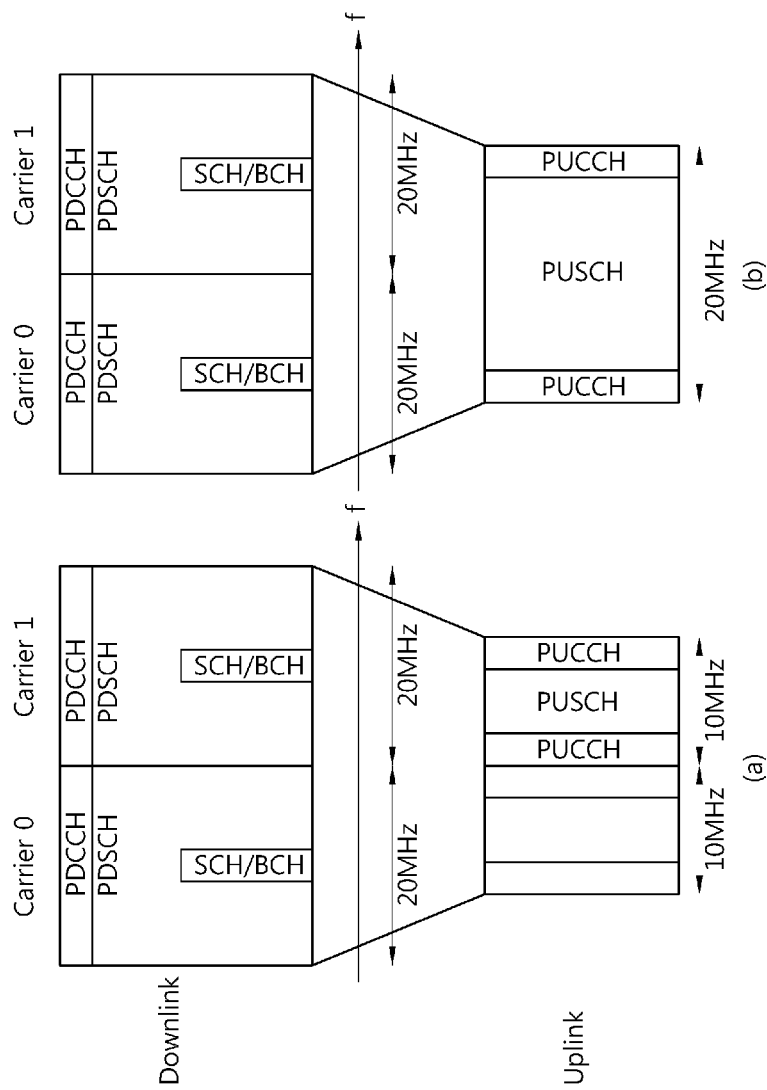
FIG. 9 is a diagram showing another example of a structure of uplink/downlink in the multi-carrier system.

FIG. 9 is a diagram showing another example of a structure of the uplink/downlink in the multi-carrier system. FIG. 9 (a) shows the case in which the number of uplink carriers and the number of downlink carriers are the same in two but the magnitude in the bandwidth (10 MHz) of the uplink carriers and the magnitude in the bandwidth (20 MHz) of the downlink carriers are different from each other and FIG. 9 (b) shows the case in which the number of uplink carriers and the number of downlink carriers are different from each other but both the magnitude in the bandwidth of the uplink carriers and the magnitude in the bandwidth of the downlink carriers become 20 MHz.

Hereinafter, a communication method using a guard band between the multi carriers will be described.

Figure 10:
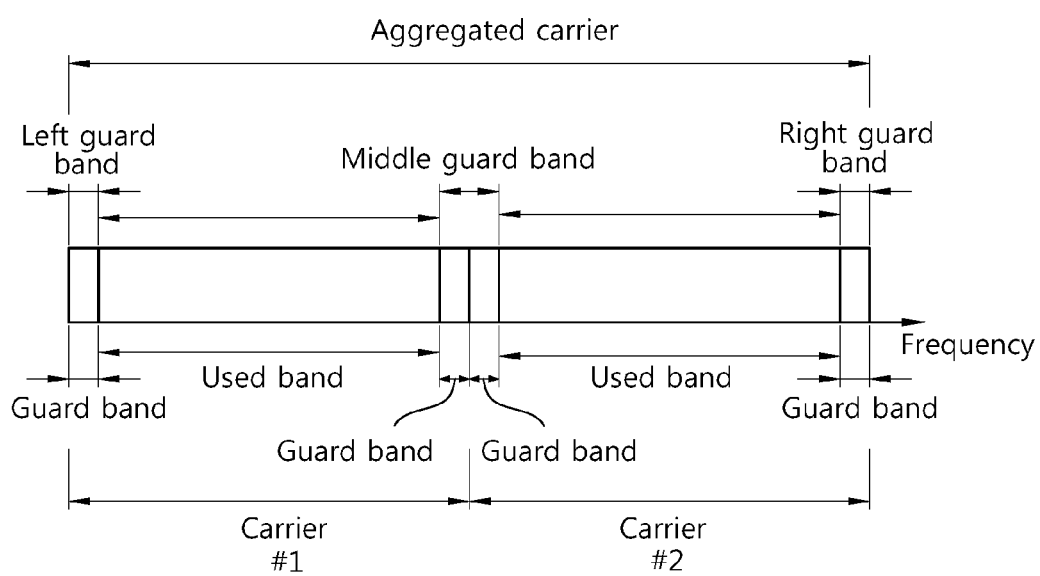
FIG. 10 is a diagram showing an example of the carrier aggregation.

FIG. 10 shows an example of the carrier aggregation.

In FIG. 10, carrier #1 and carrier #2 are aggregated to form a single wide band carrier. As such, the carrier formed by aggregating the plurality of carriers may be referred to as an aggregated carrier.

When the frequency band of the single carrier is 20 MHz, a frequency band that may be used to transmit signals (reference signals, user data, or the like) is not always 20 MHz in filtering characteristics. The frequency band that can be used for the transmission of the signals in each carrier may be referred to as a used band and the frequency band that prevents interference from occurring in the used band may be referred to as the guard band. When the frequency band of the carrier is 20 MHz, it is assumed that RBs included in the used band are a maximum of 100. When 100 RBs are included in the used band, each RB includes 12 subcarriers and the subcarrier spacing is 15 kHz, such that the used band becomes 18.015 MHz (1201×15 k). The reason why the number of subcarriers included in the used band becomes 1201 is that the used band includes a DC subcarrier. The DC subcarrier, which is a subcarrier positioned at a central frequency of the carrier, is a reference of a bandwidth and is a null subcarrier that does not transmit data. Further, the remaining frequency band other than the used band serves as the guard band. Hereinafter, in order to elucidate the present invention, it is assumed that the RBs included in the used band at the carriers of 20 MHz are a maximum of 100 but is not limited thereto. Therefore, the RBs of 110 or less included in the used band may be set as maximum RB and may be applied to the exemplary embodiments of the present invention to be described below (Since a standardization plan regarding a physical layer of the existing LTE Rel-8 is designed to allow the used band to receive 110 RBs, it is possible to set the maximum to 110 RBs in the used band in terms of supporting backward compatibility).

The aggregated carriers may include a left guard band, a right guard band, and a middle guard band. The left guard band and the right guard band are a guard band to prevent the interference between the aggregated carrier and the carriers other than the aggregated carriers (and/or between the aggregated carrier and other aggregated carriers). The middle guard band is a guard band positioned between the used bands of the carriers included in the aggregated carrier. If N (N is an integer of 2 or more) carriers are aggregated in the aggregated carrier, N−1 middle guard bands may be present. In communication through the single carrier, the signals are not transmitted in the guard band but the signals may be transmitted in the middle guard band included in the aggregated carrier. The magnitude in the frequency band of the guard band at the carrier and the left guard band, the right guard band, and the middle guard band at the aggregated carriers may coincide with or may not coincide with each other according to the method of aggregating carriers.

The subcarriers included in the middle guard band may be allocated in order to transmit the system information and/or the system control signal of the multi-carrier system and may be allocated in order to transmit the UE-specific data and/or the UE-specific control signal. In particular, in a viewpoint of the radio resource allocation at the time of transmitting the UE-specific data and/or the UE-specific control signal and the control signal generation associated therewith, the subcarriers in the middle guard band may be defined as any special resource block (SRB). Alternatively, the subcarriers in the middle guard band may be defined as a special carrier (SC). The special resource block or the special carrier may be defined as one to (N−1) in the case of the aggregation of N carriers and may be defined as one special resource block or the special carrier by grouping the subcarriers in at least one middle guard band. Further, a unique coding rate and a modulation scheme for individual special resource blocks or for each special carrier can be defined. Or a sole coding rate and a sole modulation scheme for at least one special resource block or the special carriers can be defined and applied. The use of the subcarriers in the middle guard band may also be applied to the uplink carrier aggregation as well as the downlink carrier aggregation.

The specific information (for example, reference signals) for optimizing the system may be mapped to the middle guard band. The specific information may be defined as a code sequence. For example, in the multi-carrier system, when the same cell ID is applied to each carrier, the same gold sequence may be generated on the downlink reference signals (DL RS). In this case, since the same sequence is repeated in the frequency domain of the carriers, peak-to-average power ratio (PAPR)/cubic metric (CM) may be increased. In order to prevent this, the code sequence to reduce the PAPR/CM may be applied to the middle guard band.

As another example, in the case in which the uplink carriers are aggregated, in order to prevent the increase in the uplink reference signals (for example, demodulation reference signal (DM-RS) or sounding reference signal (SRS)) or the PAPR/CM on the uplink physical channel (PUCCH or PUSCH), the code sequence on the middle guard band can be applied.

As another example, in the case in which the downlink carriers are aggregated or the uplink carriers are aggregated, in order to improve channel estimation performance in an edge region on the frequency of the individual carrier, the code sequence for the reference signals may be applied to the subcarriers in the middle guard band.

When a plurality of middle guard bands are present (for example, when three carriers are included in the aggregated carrier, two middle guard bands are present), the code sequence may be defined for each middle guard band or a single code sequence may be defined based on the sum of all the middle guard band as a unit. The same code sequence may be mapped to each middle guard band or different code sequences may be mapped thereto.

The code sequence mapped to each middle guard band may notify any one code sequence in a code sequence set known between the base station and the user equipment. Alternatively, the code sequence may be selected and mapped based on for the specific rule or an index sequence for the code sequence set between the base station and the user equipment. In this case, the code sequence selection and mapping may be applied differently or through hopping in a unit such as the OFDM symbol, the slot, the subframe, or the radio frame. Parameters for selecting and mapping the code sequence may be signaled from the base station to the user equipment and in some cases, may be derived through the connection between other parameters. An example of a type of applicable code sequences may include a gold sequence, a constant amplitude zero auto-correlation (CAZAC) sequence, a Zardoff-Chu (ZC) sequence, a Golay sequence, a pseudo noise (PN) sequence, or a binary m-sequence, or the like. The subcarriers included in the middle guard band may be allocated based on a new radio resource allocation unit that is referred to as the above-mentioned special resource block (SRB) or special carrier (SC). This will be described in more detail below.

When a plurality of carriers are aggregated, the carriers may be aggregated by various methods. For example, in order to support the backward compatibility with the existing 3GPP LTE having a bandwidth of 20 MHz, a frequency raster may be set to be 100 kHz. This means that the spacing of the central frequency of the carrier becomes multiples of 100 kHz. According to contribution R1-083677 entitled "Updated Views on Support of Wider Bandwidth in LTE-Advanced" disclosed by NTT Docomo Co., the use of 19 subcarriers as the middle guard band has been proposed in order to obtain the frequency raster of 100 kHz.

Figure 11:
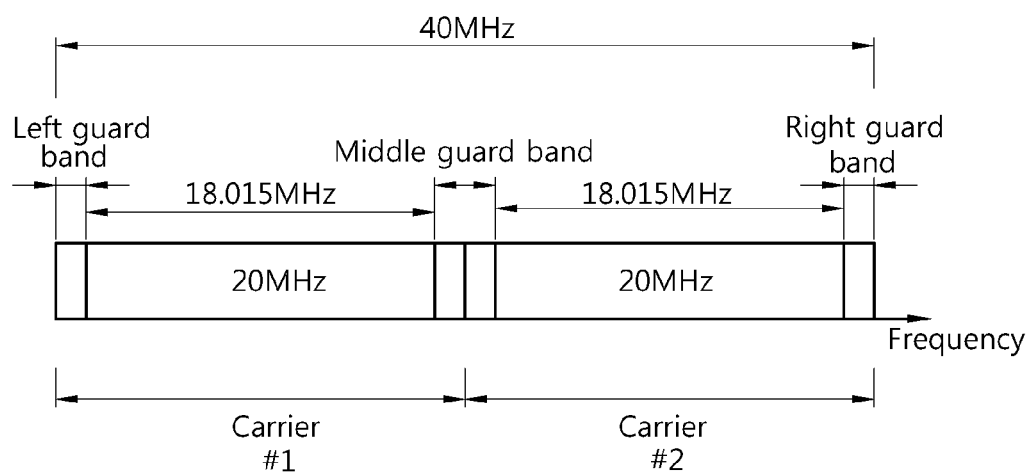
FIG. 11 is a diagram showing an example of a middle guard band when two carriers are used.

FIG. 11 shows an example of the middle guard band when two carriers are used. When the total bandwidth of the aggregated carriers is 40 MHz, two carriers having a bandwidth of 20 MHz is used, and the subcarrier spacing is 15 kHz, the magnitude of the middle guard band and the number of subcarriers included in the middle guard band are as the following table.

TABLE 4

| Occupied Bandwidth (MHz) | Left/Right Guard band (MHz) | Middle Guard band (MHz) | Number of Subcarriers in Middle guard band | Left/right Guard Band (%) |
|---|---|---|---|---|
| 36.03 | 1.8425 | 0.285 | 19 | 4.61 |
| 36.03 | 1.6925 | 0.585 | 39 | 4.23 |
| 36.03 | 1.5425 | 0.885 | 59 | 3.86 |
| 36.03 | 1.3925 | 1.185 | 79 | 3.48 |
| 36.03 | 1.2425 | 1.485 | 99 | 3.11 |
| 36.03 | 1.0925 | 1.785 | 119 | 2.73 |
| 36.03 | 0.9425 | 2.085 | 139 | 2.36 |
| 36.03 | 0.7925 | 2.385 | 159 | 1.98 |

In Table 4, the occupied bandwidth is a sum of the used band of each carrier and the left/right guard band (%) indicates the ratio of the left or right guard band in the total frequency band of the aggregated carrier. The ratio of the left or right guard band may be variously changed according to the middle guard band, the total bandwidth of the aggregated carrier, the number of RBs included, or the like.

The following Table 5 indicates an example of the middle guard band when the total bandwidth of the aggregated carriers is 60 MHz and three carriers having a bandwidth of 20 MHz are used.

TABLE 5

| Occupied Bandwidth (MHz) | Left/Right Guard band (MHz) | Middle Guard band (MHz) | Number of Subcarriers in Middle guard band | Left/right Guard Band (%) |
| --- | --- | --- | --- | --- |
| 54.045 | 2.6925 | 0.57 | 19 | 4.49 |
| 54.045 | 2.3925 | 1.17 | 39 | 3.99 |
| 54.045 | 2.0925 | 1.77 | 59 | 3.49 |
| 54.045 | 1.7925 | 2.37 | 79 | 2.99 |
| 54.045 | 1.4925 | 2.97 | 99 | 2.49 |
| 54.045 | 1.1925 | 3.57 | 119 | 1.99 |
| 54.045 | 0.8925 | 4.17 | 139 | 1.49 |
| 54.045 | 0.5925 | 4.77 | 159 | 0.99 |

The following Table 6 indicates an example of the middle guard band when the total bandwidth of the aggregated carriers is 80 MHz and four carriers having a bandwidth of 20 MHz are used.

TABLE 6

| Occupied Bandwidth (MHz) | Left/Right Guard band (MHz) | Middle Guard band (MHz) | Number of Subcarriers in Middle guard band | Left/right Guard Band (%) |
| --- | --- | --- | --- | --- |
| 72.06 | 3.5425 | 0.855 | 19 | 4.43 |
| 72.06 | 3.0925 | 1.755 | 39 | 3.87 |
| 72.06 | 2.6425 | 2.655 | 59 | 3.30 |
| 72.06 | 2.1925 | 3.555 | 79 | 2.74 |
| 72.06 | 1.7425 | 4.455 | 99 | 2.18 |
| 72.06 | 1.2925 | 5.355 | 119 | 1.62 |
| 72.06 | 0.8425 | 6.255 | 139 | 1.05 |
| 72.06 | 0.3925 | 7.155 | 159 | 0.49 |

The following Table 7 indicates an example of the middle guard band when the total bandwidth of the aggregated carriers is 100 MHz and five carriers having a bandwidth of 20 MHz are used.

TABLE 7

| Occupied Bandwidth (MHz) | Left/Right Guard band (MHz) | Middle Guard band (MHz) | Number of Subcarriers in Middle guard band | Left/right Guard Band (%) |
| --- | --- | --- | --- | --- |
| 90.075 | 4.3925 | 1.14 | 19 | 4.39 |
| 90.075 | 3.7925 | 2.34 | 39 | 3.79 |
| 90.075 | 3.1925 | 3.54 | 59 | 3.19 |
| 90.075 | 2.5925 | 4.74 | 79 | 2.59 |
| 90.075 | 1.9925 | 5.94 | 99 | 1.99 |
| 90.075 | 1.3925 | 7.14 | 119 | 1.39 |
| 90.075 | 0.7925 | 8.34 | 139 | 0.79 |
| 90.075 | 0.1925 | 9.54 | 159 | 0.19 |

The following Table 8 indicates an example of the middle guard band when the total bandwidth of the aggregated carriers is 30 MHz and two carriers having a bandwidth of 20 MHz and 10 MHz, respectively, are used.

TABLE 8

| Occupied Bandwidth (MHz) | Left/Right Guard band (MHz) | Middle Guard band (MHz) | Number of Subcarriers in Middle guard band | Left/right Guard Band (%) |
| --- | --- | --- | --- | --- |
| 27.03 | 1.3425 | 0.285 | 19 | 4.48 |
| 27.03 | 1.1925 | 0.585 | 39 | 3.98 |
| 27.03 | 1.0425 | 0.885 | 59 | 3.48 |
| 27.03 | 0.8925 | 1.185 | 79 | 2.98 |
| 27.03 | 0.7425 | 1.485 | 99 | 2.48 |

TABLE 8-continued

| Occupied Bandwidth (MHz) | Left/Right Guard band (MHz) | Middle Guard band (MHz) | Number of Subcarriers in Middle guard band | Left/right Guard Band (%) |
| --- | --- | --- | --- | --- |
| 27.03 | 0.5925 | 1.785 | 119 | 1.98 |
| 27.03 | 0.4425 | 2.085 | 139 | 1.48 |
| 27.03 | 0.2925 | 2.385 | 159 | 0.97 |

The following Table 9 indicates an example of the middle guard band when the total bandwidth of the aggregated carriers is 25 MHz and two carriers having a bandwidth of 20 MHz and 5 MHz, respectively, are used.

TABLE 9

| Occupied Bandwidth (MHz) | Left/Right Guard band (MHz) | Middle Guard band (MHz) | Number of Subcarriers in Middle guard band | Left/right Guard Band (%) |
| --- | --- | --- | --- | --- |
| 22.53 | 1.1675 | 0.135 | 9 | 4.67 |
| 22.53 | 1.0175 | 0.435 | 29 | 4.07 |
| 22.53 | 0.8675 | 0.735 | 49 | 3.47 |
| 22.53 | 0.7175 | 1.035 | 69 | 2.87 |
| 22.53 | 0.5675 | 1.335 | 89 | 2.27 |
| 22.53 | 0.4175 | 1.635 | 109 | 1.67 |
| 22.53 | 0.2675 | 1.935 | 129 | 1.07 |
| 22.53 | 0.1175 | 2.235 | 149 | 0.47 |

Various middle guard bands included in the aggregated carriers, as described above, may be used to transmit signals in communication between the user equipment supporting the multi-carrier system or the relay station and the base station. In order to increase the efficiency of the resource use, how to use the middle guard band is proposed.

As described above, the existing resource block including 12 subcarriers and other special resource blocks (SRB) or the special carrier (SC) may be defined for the guard carriers within the middle guard band. The SRB may be a basic unit for allocating resources within the middle guard band. At least one SRB may be defined within the middle guard band. The SRB may include the subcarriers of multiples of 9 (9, 18, 27, or the like) in the frequency domain. Alternatively, the SRB may include the subcarriers of multiples of 19 (19, 38, 57, or the like) in the frequency domain. For example, the SRB may include the subcarriers of multiples of 19 when the carriers included in the aggregated subcarrier have the same bandwidth or when the carriers having a bandwidth of 10 MHz and the carriers having a bandwidth of 20 MHz are aggregated. When the carriers having different bandwidths are aggregated, the SRB may include the subcarriers of a multiple number of 9 in the case in which a single carrier has a bandwidth of 5 MHz.

The SRB may be used to transmit the system information or to transmit the user equipment-specific control information. The independent coding rate and/or the modulation scheme for each SRB may be used and the same coding rate and/or the modulation scheme may also be used.

In the SRB, the information may be transferred by mapping the code sequence having the length corresponding to the number of subcarriers included in the SRB. When the SRB includes 19 subcarriers, the code sequence of a length of 19 may be used. The code sequence is not limited and the widely known sequence such as the constant amplitude zero auto correlation (CAZAC) sequence, the Zadoff-Chu (ZC) sequence, the gold sequence, the Golay sequence, the Kasami sequence, the m-sequence, the pseudo-noise (PN) sequence, or the like, may be used. The code sequence may be hopped in the OFDM symbol unit, the slot unit, the subframe unit, or the radio frame unit. For example, different cyclic shifts are used in the OFDM symbol unit.

The code sequence transmitted through the SRB may be designed in order to prevent the peak-to-average power ratio (PAPR)/cubic metric (CM) from increasing in the downlink reference signals (DL RS) or the uplink reference signals. Alternatively, the SRB may be used to transmit the reference signals in order to improve the channel estimation performance. Hereinafter, the exemplary embodiment of the present invention describes as an example the reference signals to prevent the increase in the PAPR/CM of the downlink reference signals (DL RS) but is not limited thereto. The exemplary embodiment of the present invention may be similarly applied to even in the case in which the code sequence for preventing the PAPR/CM from increasing in the uplink demodulation reference signals (DM RS) and/or the sounding reference signal (SRS) and/or the PUCCH or the PUSCH.

The reference signal arrangement within the middle guard band will now be described.

Figure 12:
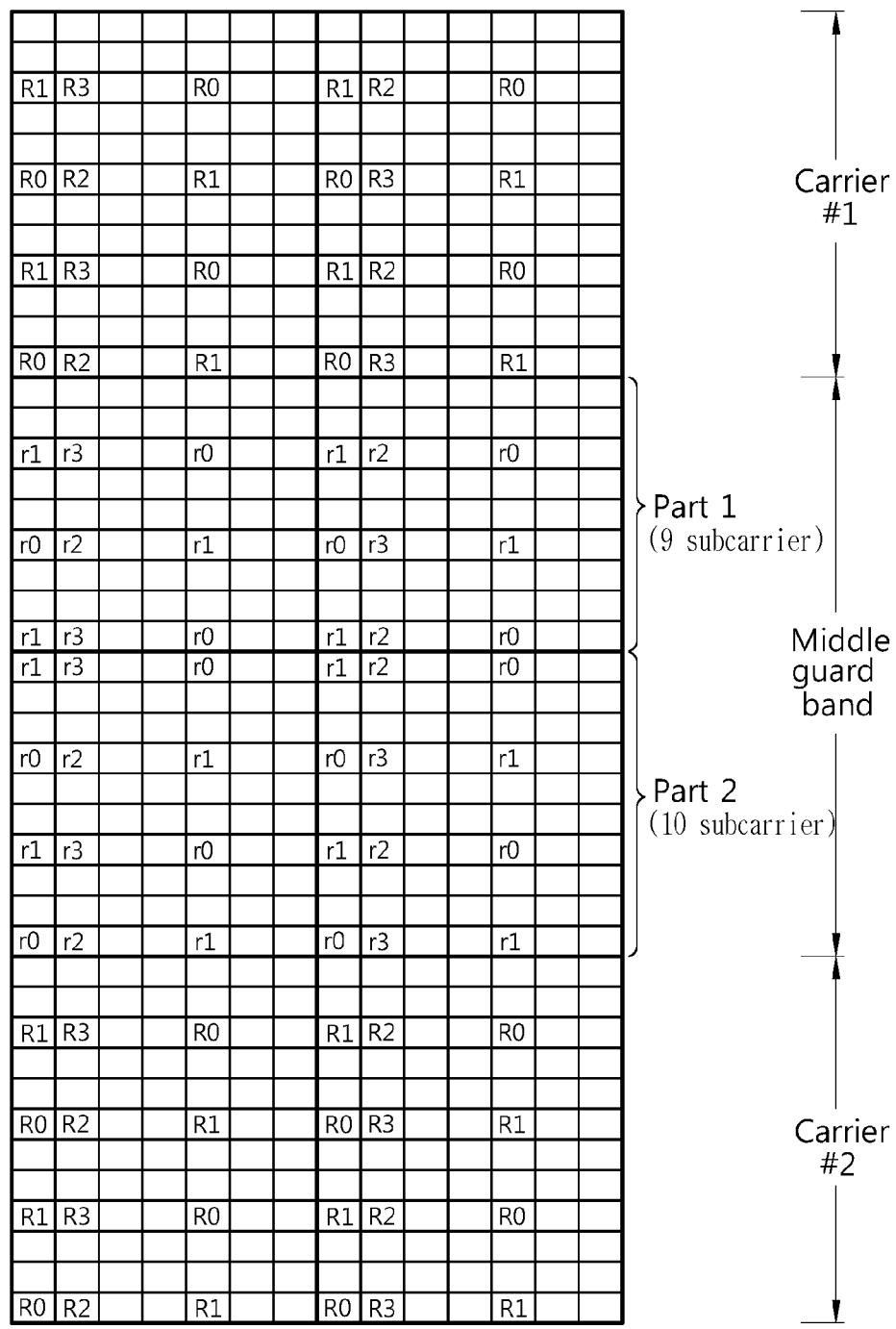
FIG. 12 is a diagram showing an example of a reference signal arrangement at a normal CP and FIG. 13 is a diagram showing an example of a reference signal arrangement at an extended CP.
Figure 13:
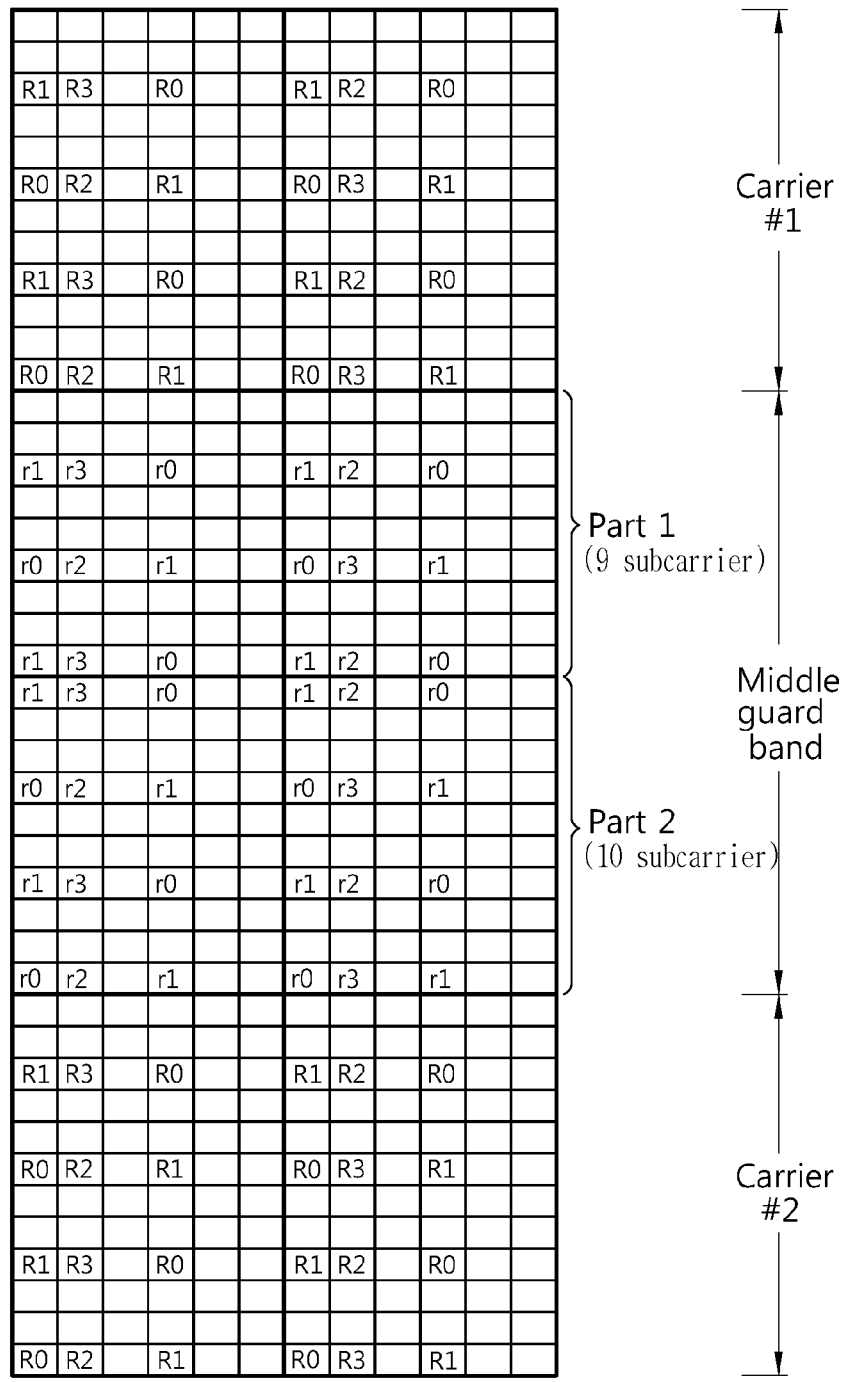

FIG. 12 shows an example of a reference signal arrangement at a normal CP and FIG. 13 is a diagram showing an example of a reference signal arrangement at an extended CP. R0 and r1 indicate the reference signal for a first antenna port, R1 and r1 indicate the reference signal for a second antenna port, R2 and r2 indicate the reference signal for a third antenna port, and R3 and r3 are the reference signal for a fourth antenna port. R0 to R3, which are allocated to each carrier, use the structure of the downlink reference signal disclosed in section 6 of the existing 3GPP TS 36.211 V8. 4.0 (2008-09) as they are. r0 to r3 are the reference signals within the middle guard band.

FIGS. 12 and 13 show the reference signal arrangement in the middle guard band in order to improve the channel estimation performance at the edges of each carrier. The middle guard band includes 19 subcarriers. The middle guard band is divided into a first part that has 9 subcarriers and a second part that has 10 subcarriers. The first part and the second part are used to estimate the channel of the contiguous carriers. The first part is used to estimate the channel of carrier #1 and the second part is used to estimate the channel of carrier #2.

The reference signals may have the same time spacing and subcarrier spacing as the existing LTE within the middle guard band. For example, the reference signal for the same antenna port may be arranged at four OFDM symbol spacings in a time domain. The reference signals for each antenna port at a single slot unit may be arranged at three subcarrier spacings (for example, r0 may be disposed at subcarrier #n and r1 may be disposed at subcarrier # (n+3)). That is, in FIGS. 12 and 13, the reference signals in the middle guard band are arranged to have the same time spacing and subcarrier spacing as the reference signals used in the used band of the carrier.

Figure 14:
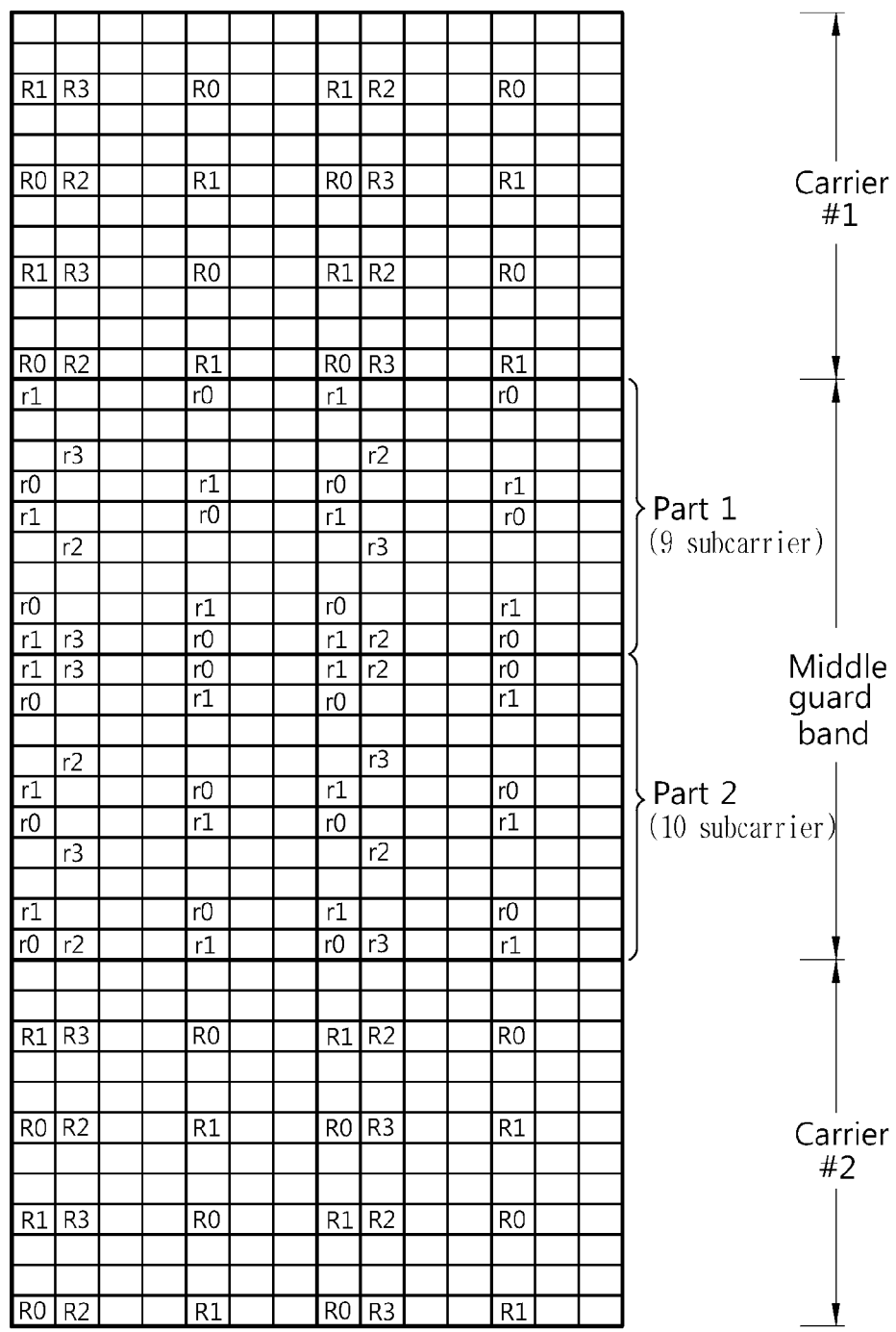
FIG. 14 is a diagram showing another example of a reference signal arrangement at a normal CP and FIG. 15 is a diagram showing another example of a reference signal arrangement at an extended CP.
Figure 15:
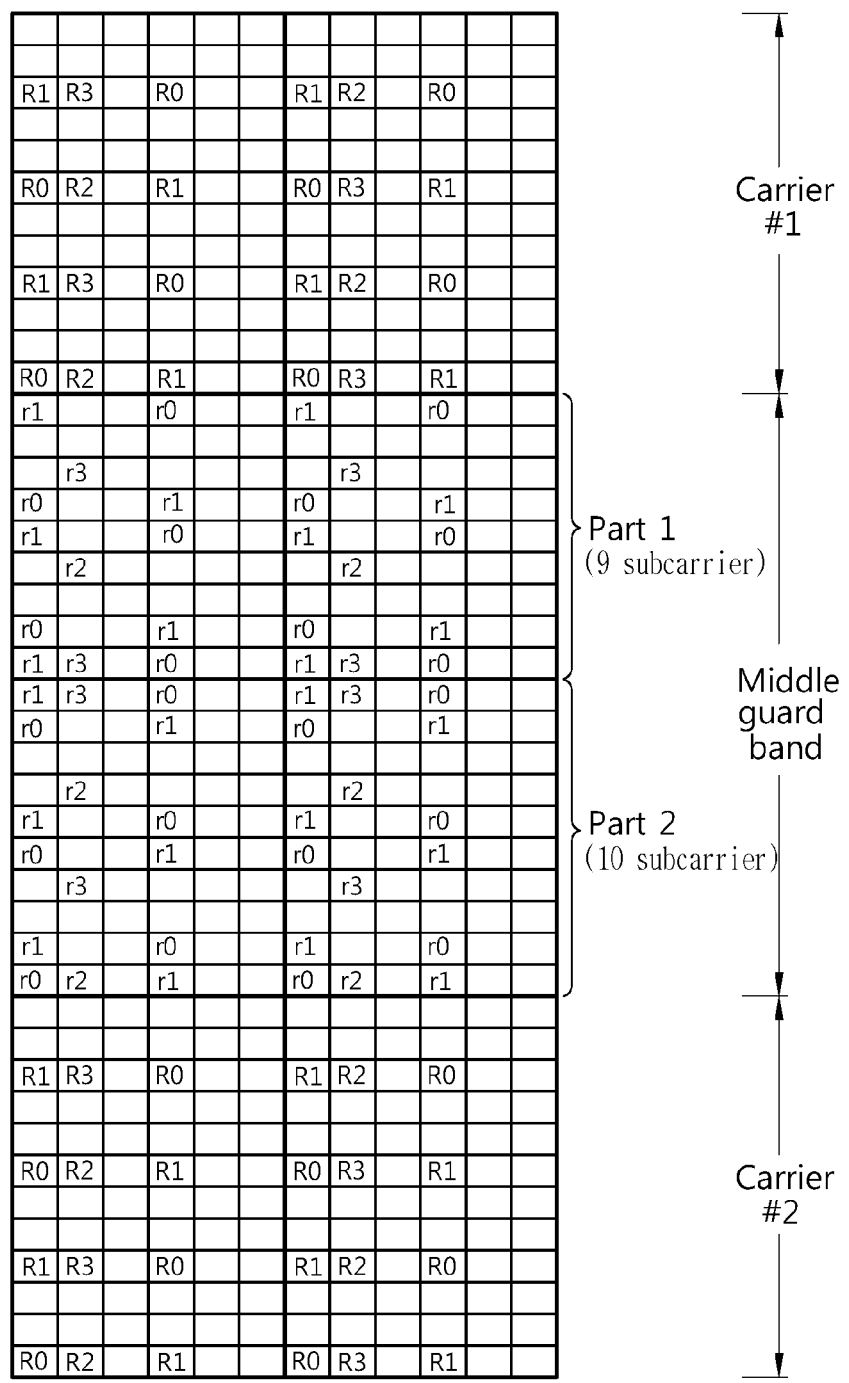

FIG. 14 shows another example of a reference signal arrangement at a normal CP and FIG. 15 is a diagram showing another example of a reference signal arrangement at an extended CP. This corresponds to the reference signal arrangement in the middle guard band in order to improve the channel estimation performance at the edges of each carrier. The first part is used to estimate the channel of carrier #1 and the second part is used to estimate the channel of carrier #2. Comparing with the exemplary embodiment of FIGS. 12 and 13, the subcarrier spacing of r0 and r1 becomes four subcarriers at a single OFDM symbol and the subcarrier spacing of r2 and r3 becomes 6 subcarriers. Further, r0 and r1 are arranged at the contiguous subcarriers. That is, in FIGS. 14 and 15, the reference signals in the middle guard band are arranged like the reference signals used in the used band of the carrier at only some of the OFDM symbols.

Figure 16:
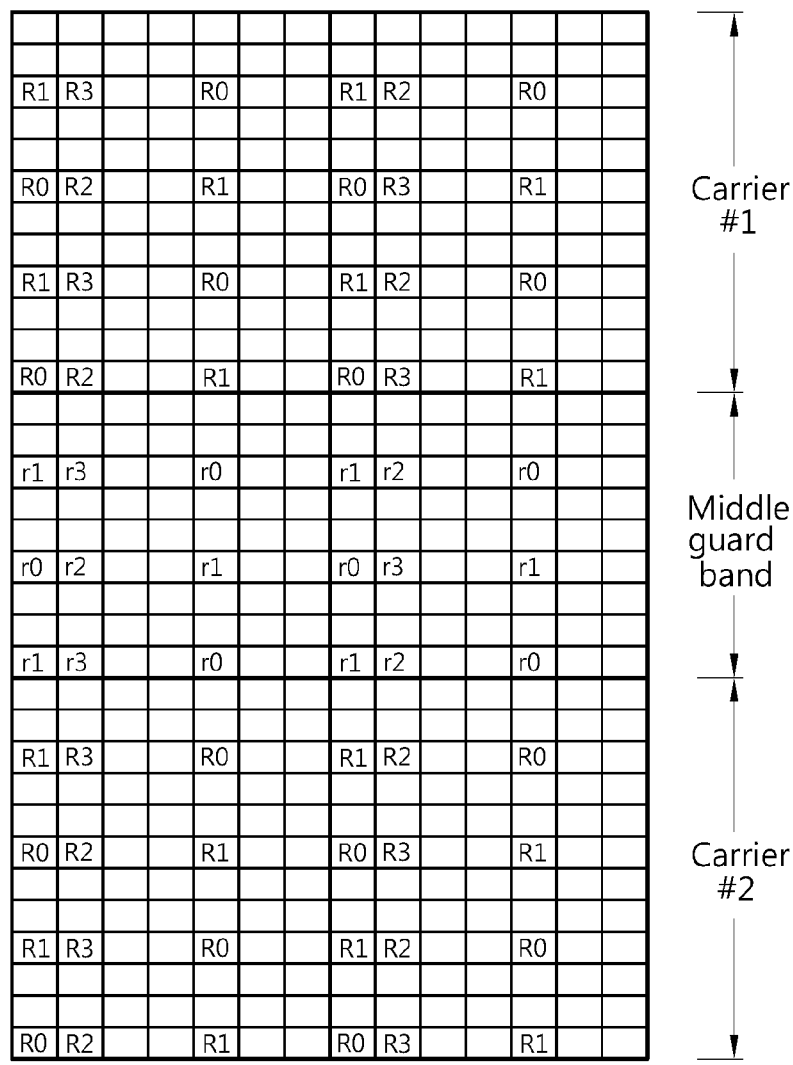
FIG. 16 is a diagram showing an example of a reference signal arrangement at a normal CP and FIG. 17 is a diagram showing an example of a reference signal arrangement at an extended CP.
Figure 17:
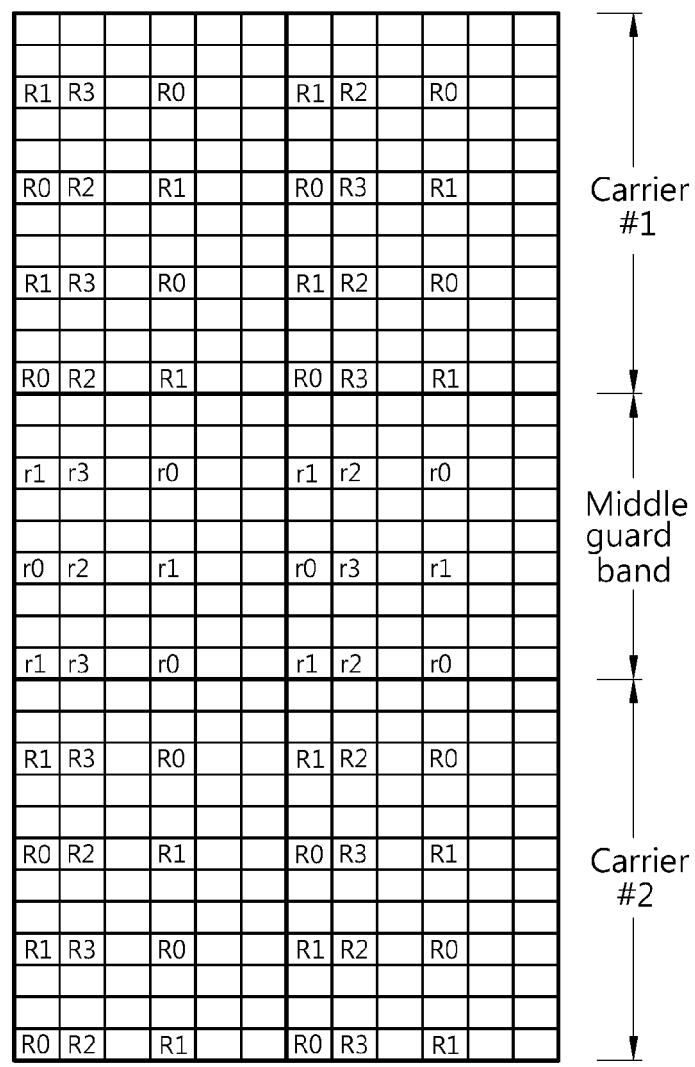

FIG. 16 is a diagram showing an example of a reference signal arrangement at a normal CP and FIG. 17 is a diagram showing an example of a reference signal arrangement at an extended CP. This corresponds to the case in which the middle guard band includes 9 subcarriers. In this case, one of the subcarriers #1 and #2 may have a bandwidth of 5 MHz and the bandwidth of carriers #1 and #2 may be different from each other. The reference signals within the middle guard band are arranged to have the same time spacing and subcarrier spacing as the existing LTE.

Figure 18:
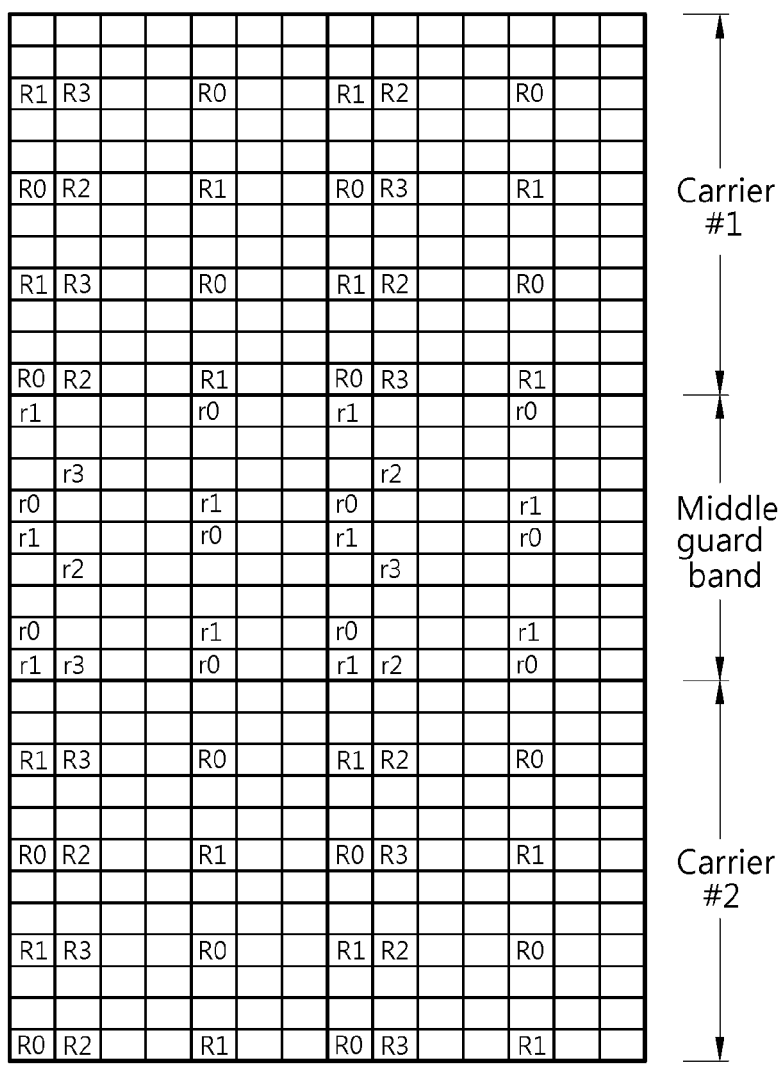
FIG. 18 is a diagram showing another example of a reference signal arrangement at a normal CP and FIG. 19 is a diagram showing another example of a reference signal arrangement at an extended CP.
Figure 19:
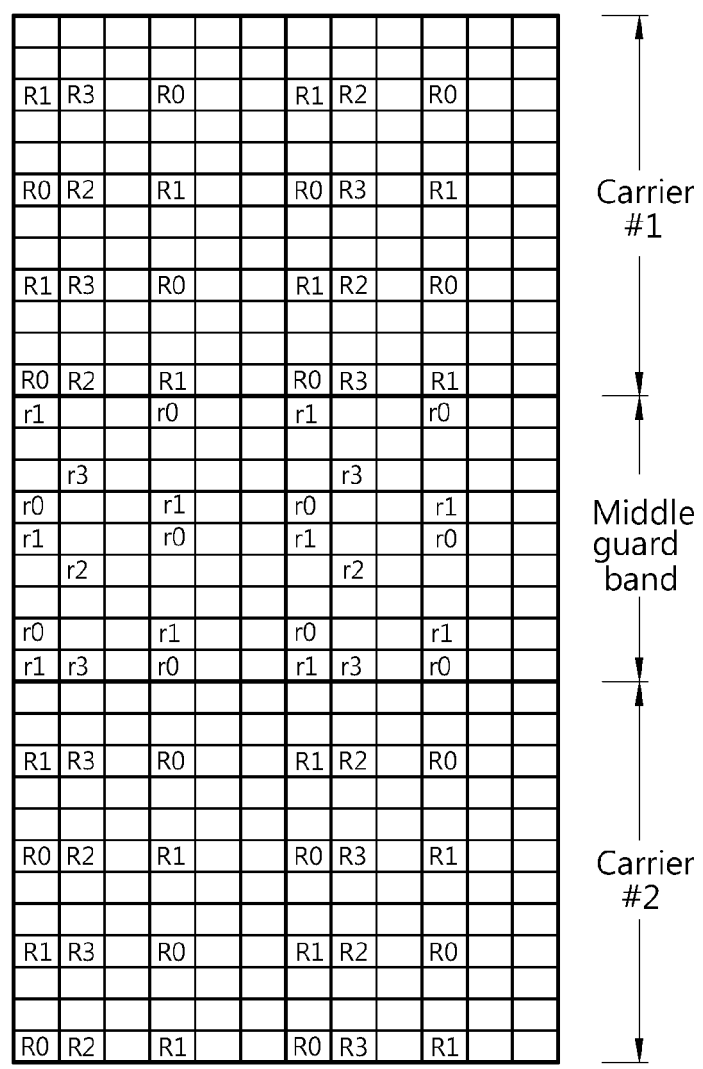

FIG. 18 is a diagram showing another example of a reference signal arrangement at a normal CP and FIG. 19 is a diagram showing another example of a reference signal arrangement at an extended CP. Comparing with the exemplary embodiment of FIGS. 16 and 17, the subcarrier spacing of r0 and r1 becomes four subcarriers at a single OFDM symbol and the subcarrier spacing of r2 and r3 becomes 6 subcarriers. Further, r0 and r1 are arranged at the contiguous subcarriers. That is, in FIGS. 18 and 19, the reference signals in the middle guard band are arranged like the reference signals used in the used band of the carrier at only some of the OFDM symbols.

The exemplary embodiment of FIGS. 12 to 15 may be applied in the case in which two carrier bandwidths are (20 MHz, 20 MHz), (10 MHz, 10 MHz), and (20 MHz, 10 MHz). The exemplary embodiment of FIGS. 16 to 19 may be applied in the case in which two carrier bandwidths are (20 MHz, 5 MHz) and (10 MHz, 5 MHz). Only the reference signals may be transmitted within the middle guard band or the reference signals and the user data may be simultaneously transmitted within the middle guard band.

Figure 20:
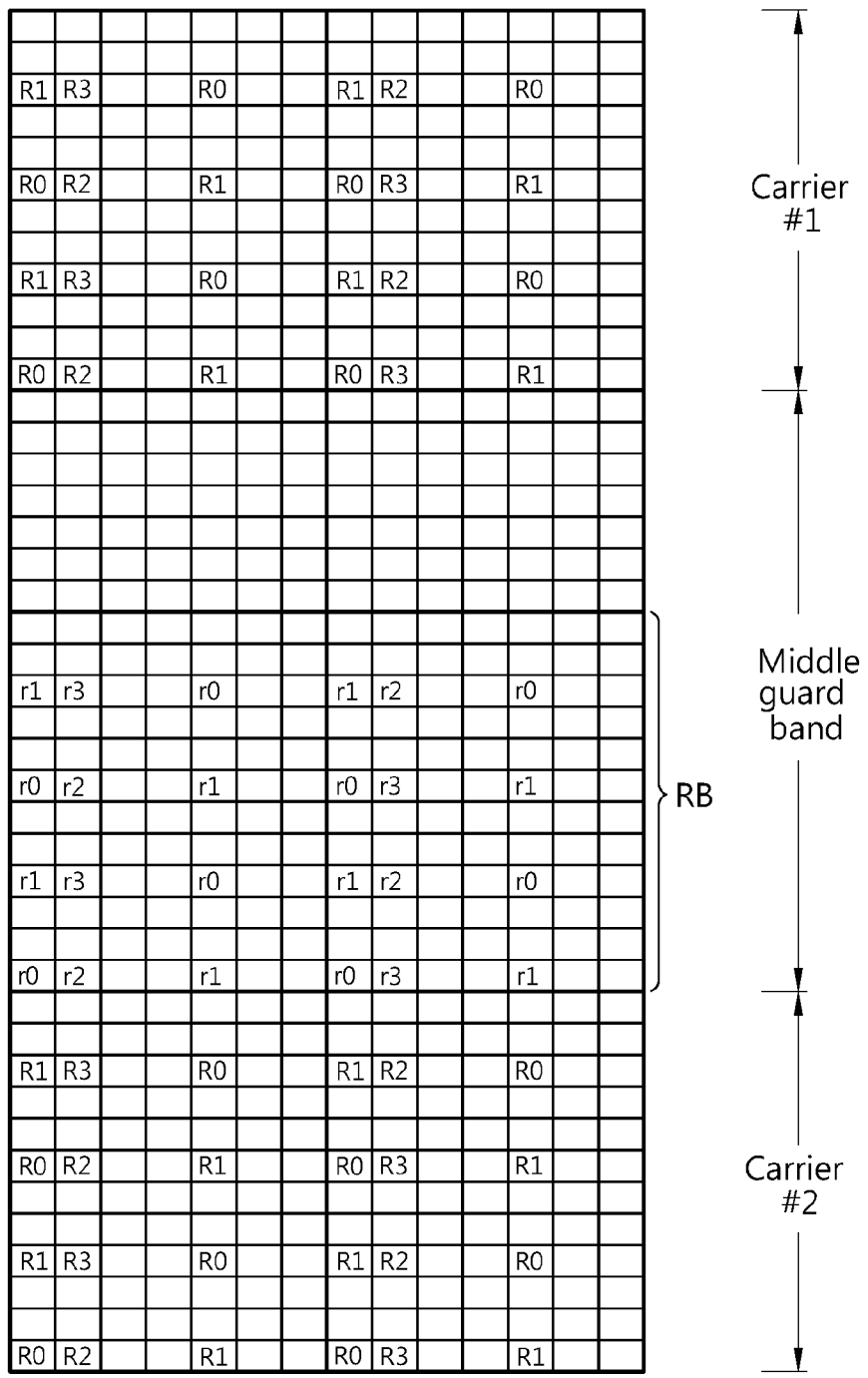
FIG. 20 is a diagram showing an example of a reference signal arrangement at a normal CP and FIG. 21 is a diagram showing an example of a reference signal arrangement at an extended CP.
Figure 21:
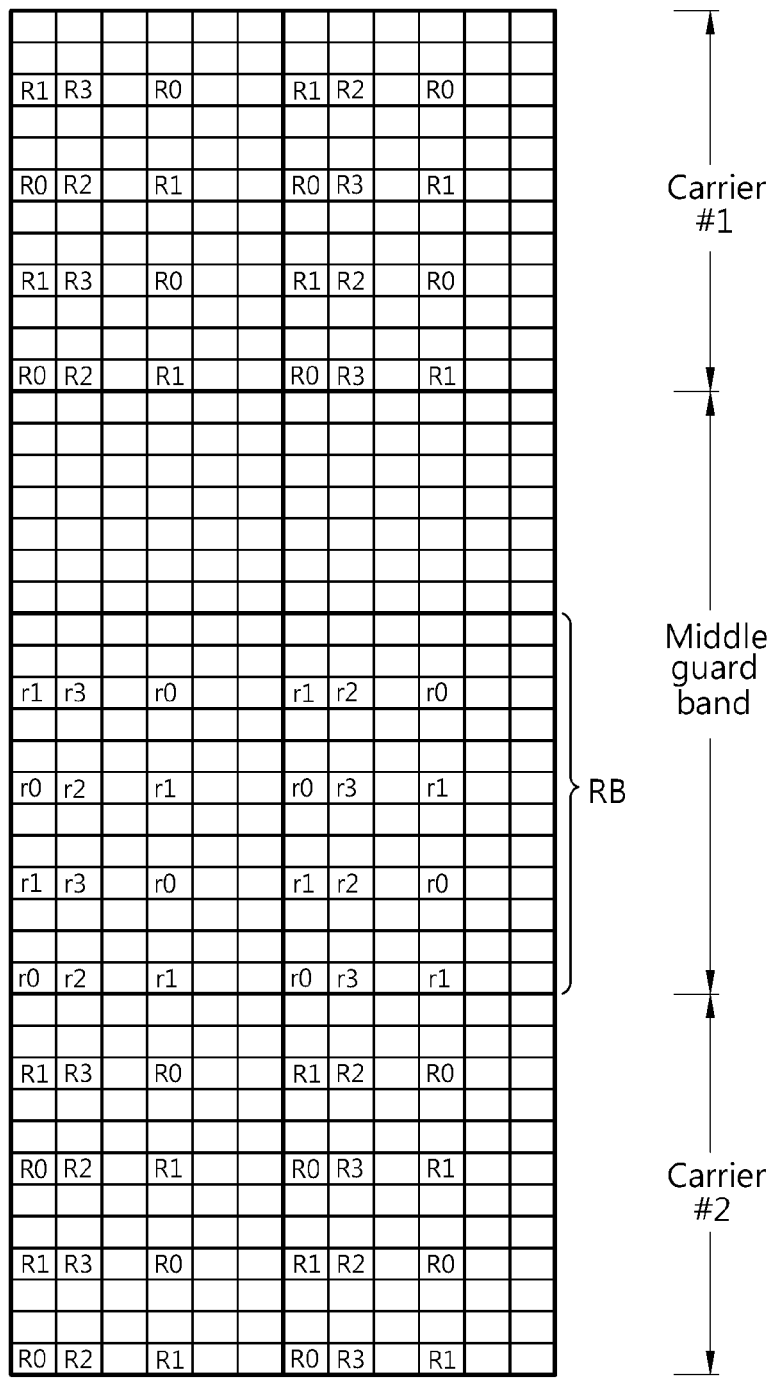

FIG. 20 is a diagram showing an example of a reference signal arrangement at a normal CP and FIG. 21 is a diagram showing an example of a reference signal arrangement at an extended CP. The middle guard band includes 19 subcarriers. 12 subcarriers arrange the reference signals like the existing RB and the remaining subcarriers may be used as a null subcarrier or other channels.

Figure 22:
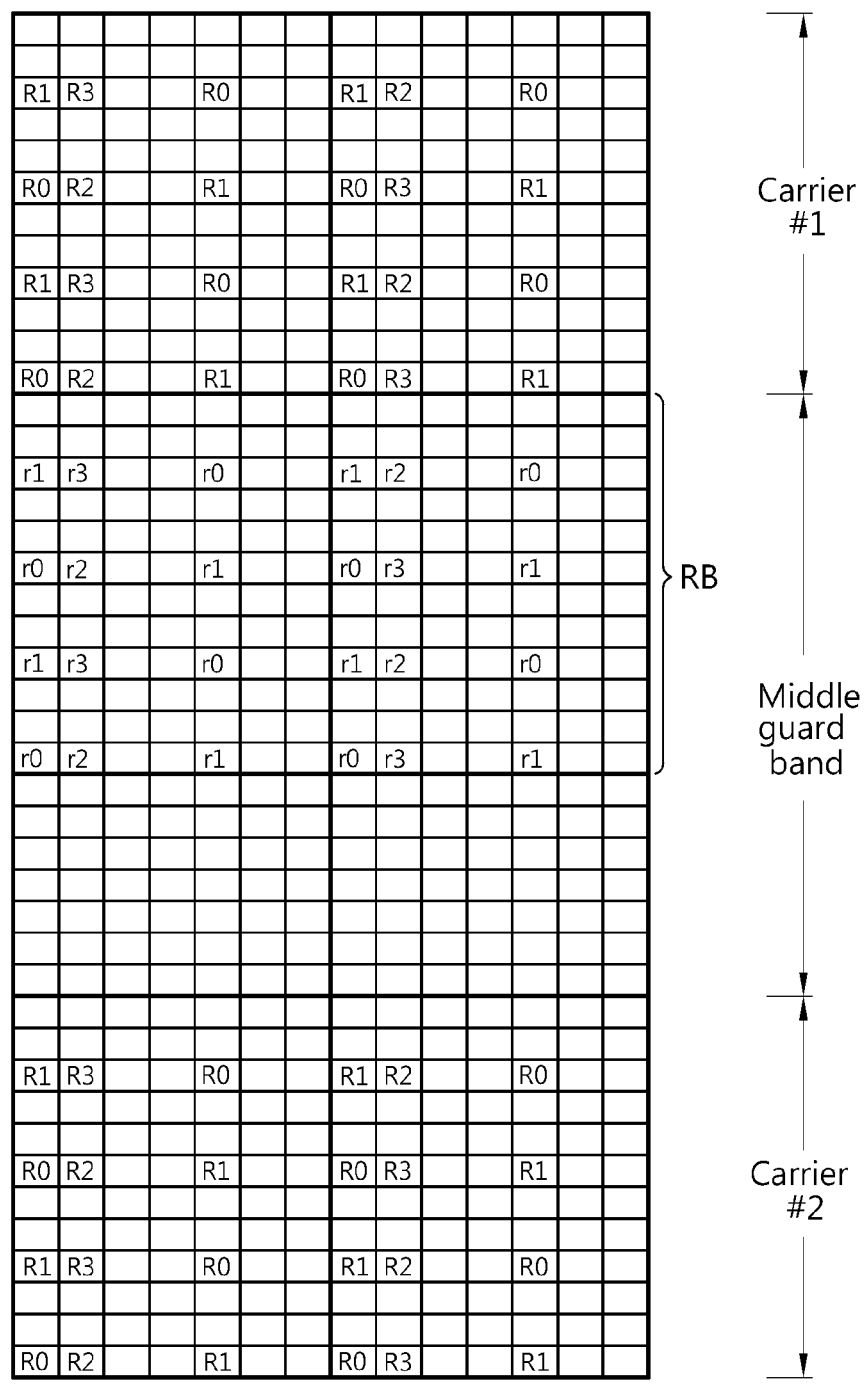
FIG. 22 is a diagram showing another example of a reference signal arrangement at a normal CP and FIG. 23 is a diagram showing another example of a reference signal arrangement at an extended CP.
Figure 23:
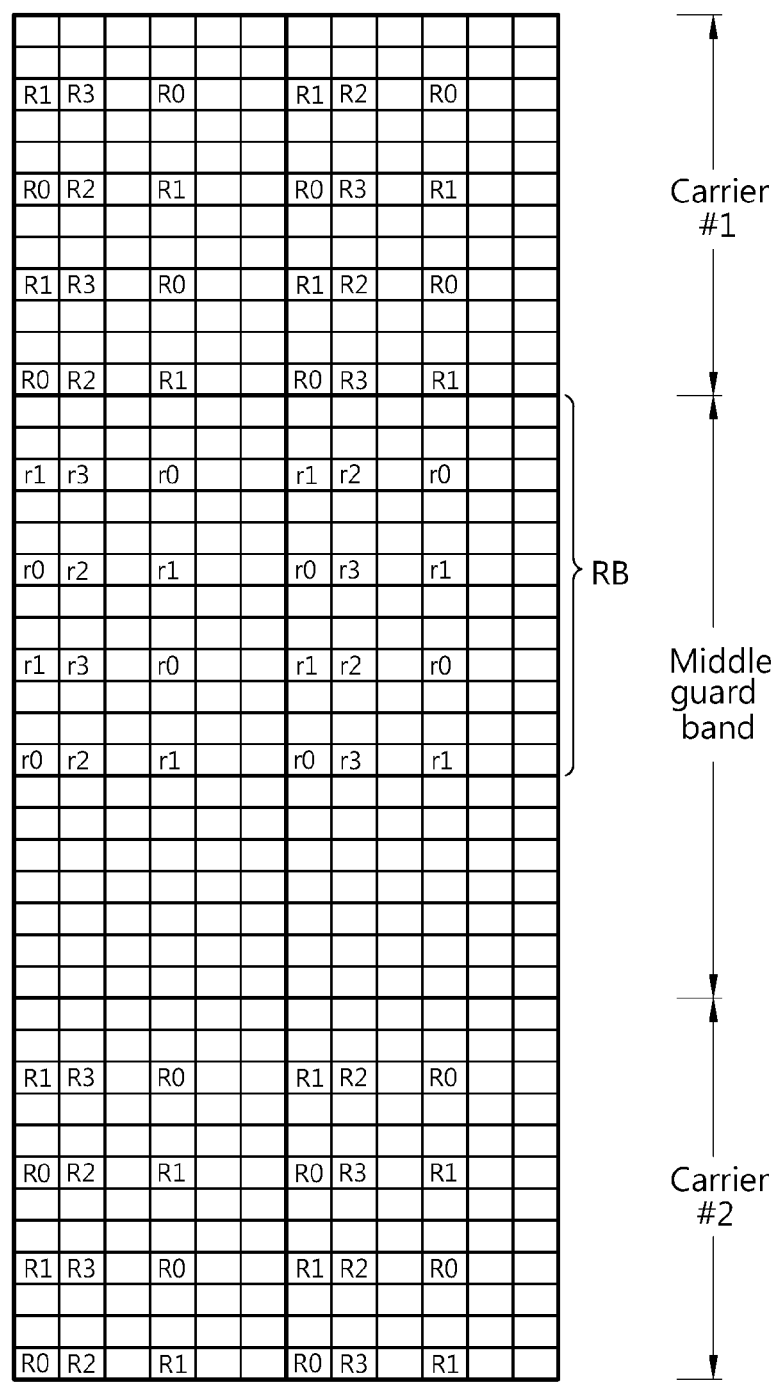

FIG. 22 is a diagram showing another example of a reference signal arrangement at a normal CP and FIG. 23 is a diagram showing another example of a reference signal arrangement at an extended CP. Comparing with the exemplary embodiment of FIGS. 20 and 21, the region in which the reference signals are disposed like the existing RB within the middle guard band is shifted to carrier #1 side.

Figure 24:
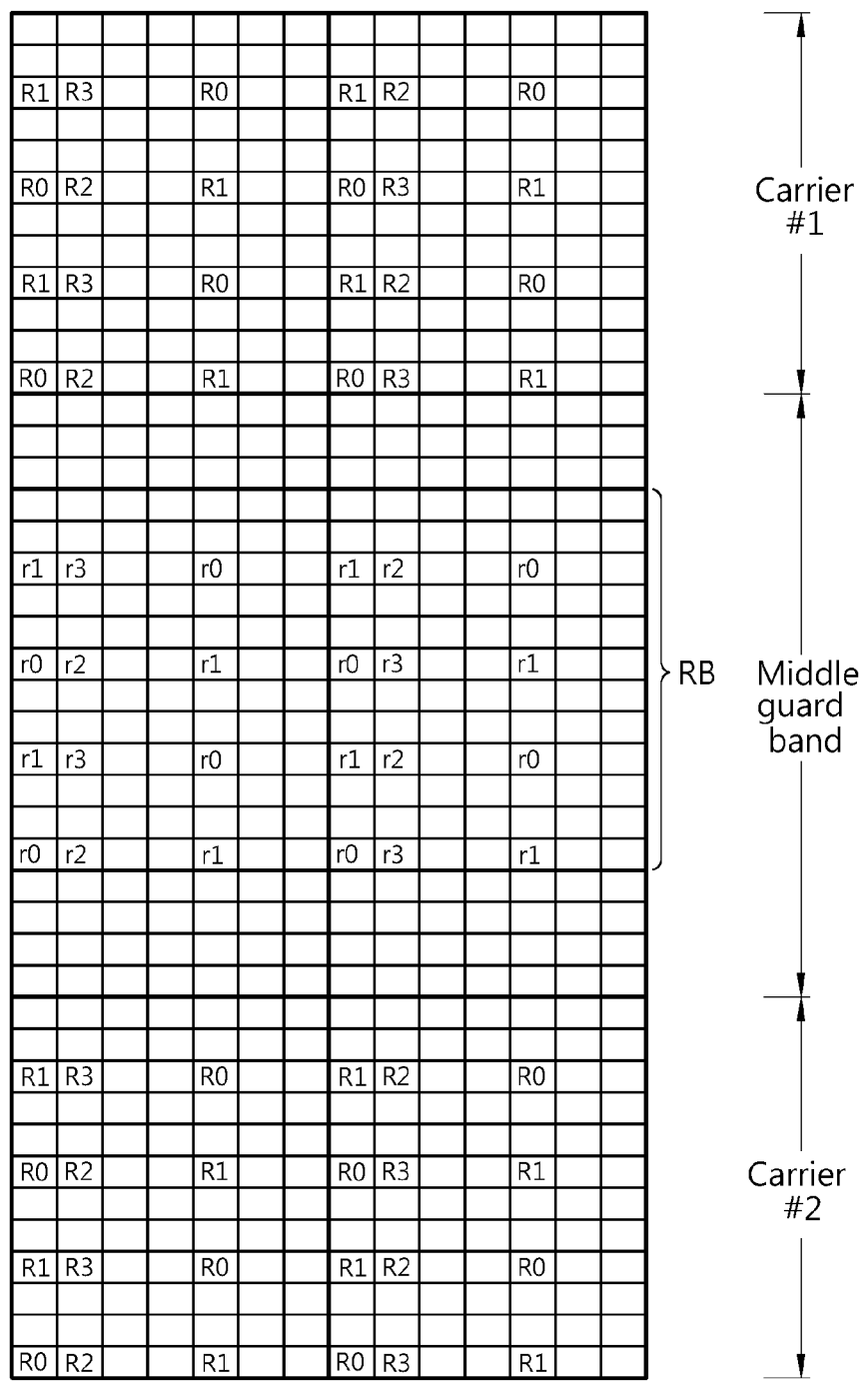
FIG. 24 is a diagram showing another example of a reference signal arrangement at a normal CP and FIG. 25 is a diagram showing another example of a reference signal arrangement at an extended CP.
Figure 25:
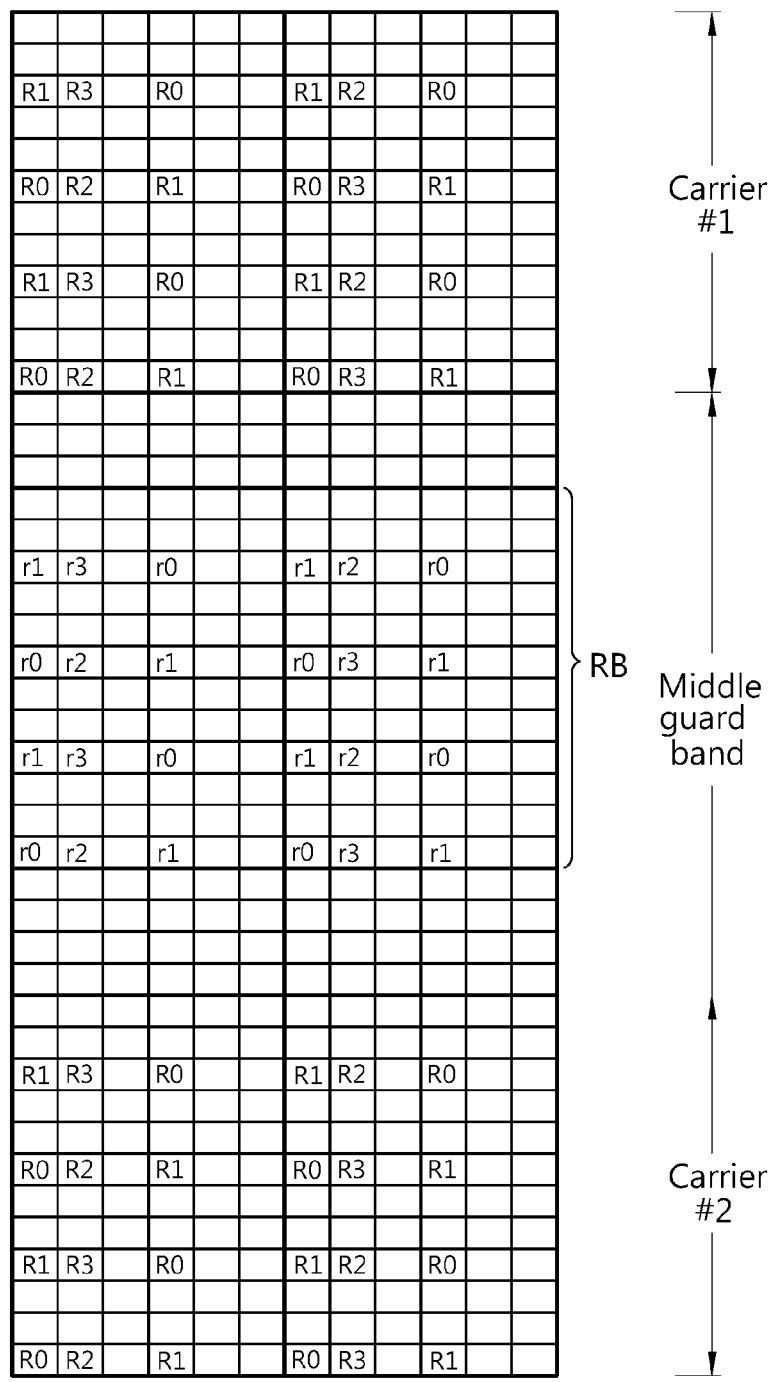

FIG. 24 is a diagram showing another example of a reference signal arrangement at a normal CP and FIG. 25 is a diagram showing another example of a reference signal arrangement at an extended CP. Comparing with the exemplary embodiment of FIGS. 20 and 21, the region in which the reference signals are arranged like the existing RB within the middle guard band is disposed at four subcarrier spacings from carrier #1 and five subcarrier spacings from carrier #2.

Figure 26:
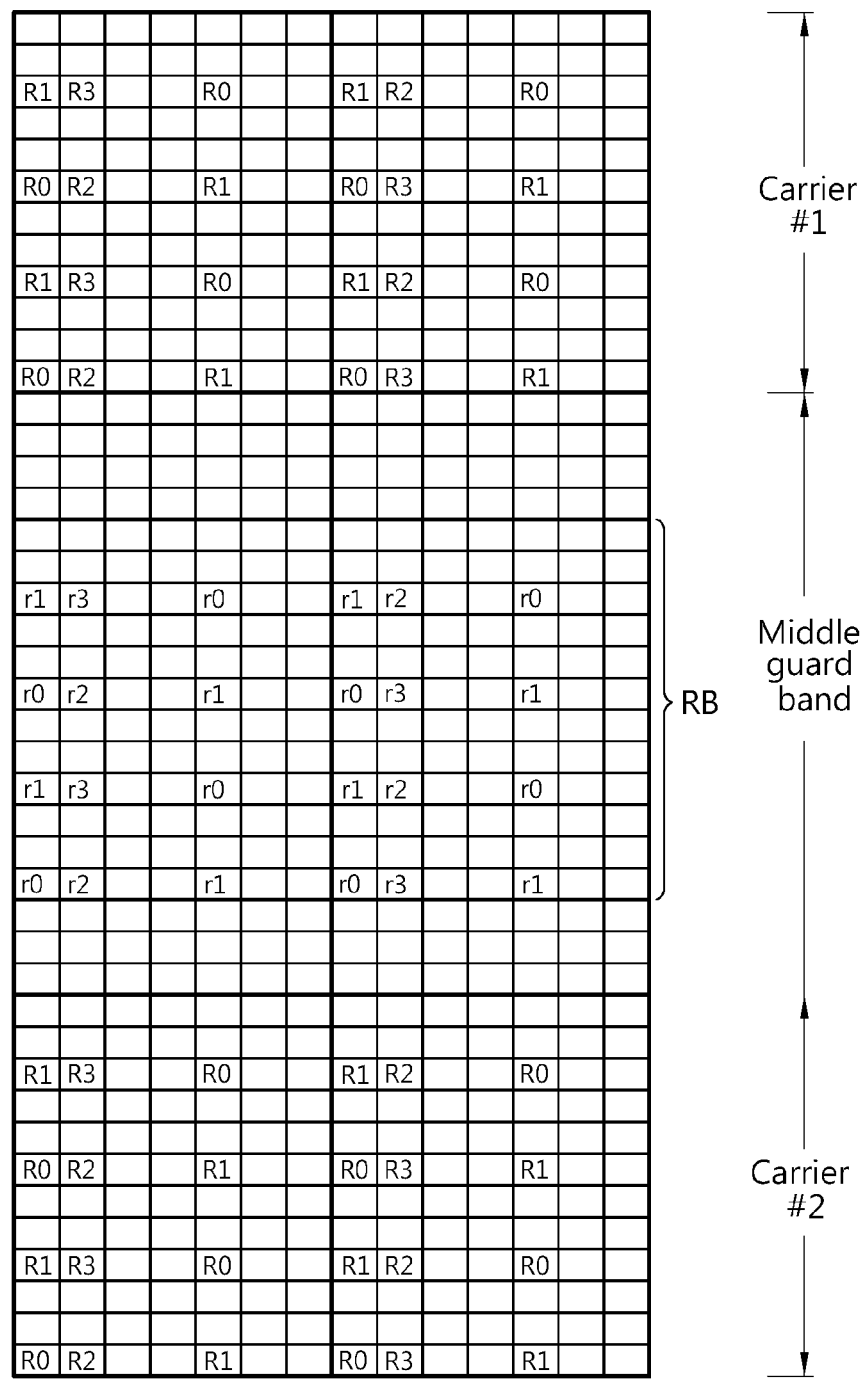
FIG. 26 is a diagram showing another example of a reference signal arrangement at a normal CP and FIG. 27 is a diagram showing another example of a reference signal arrangement at an extended CP.
Figure 27:
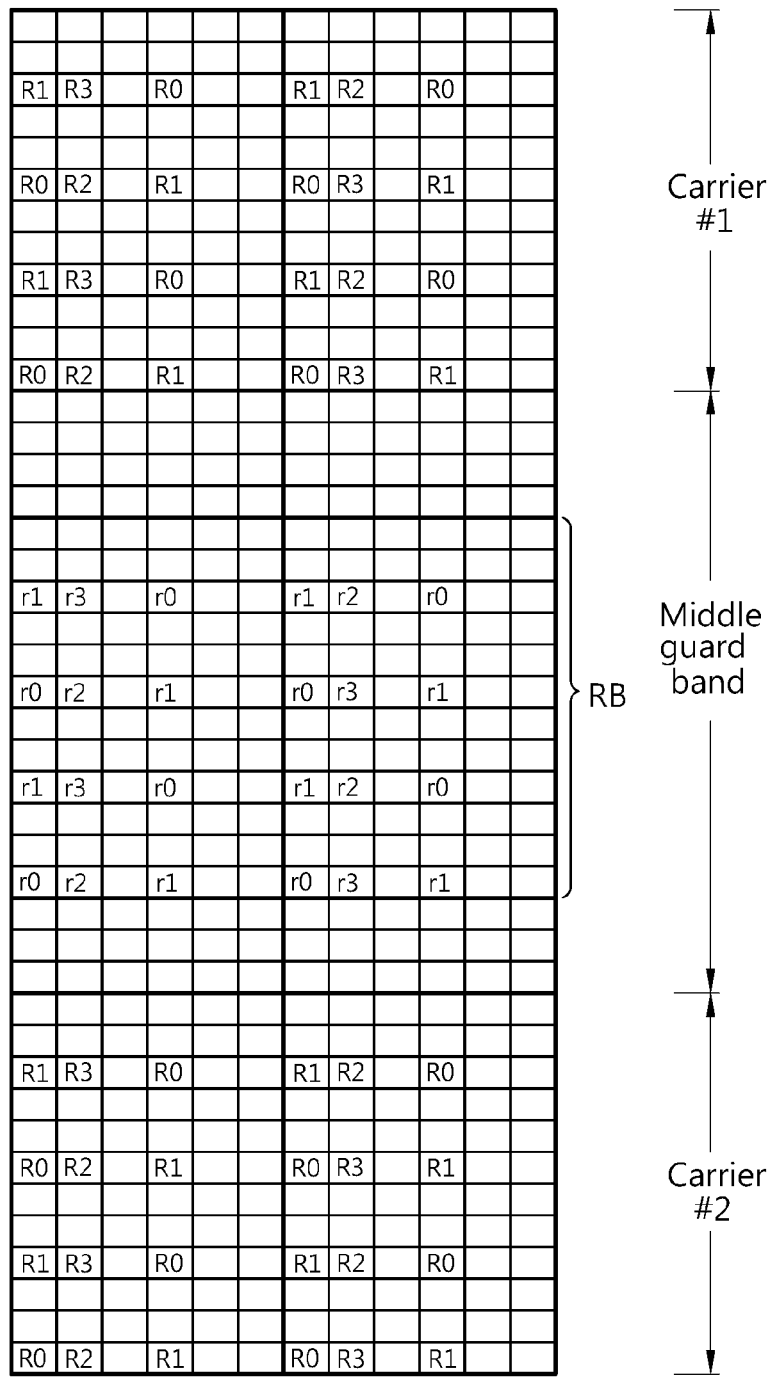

FIG. 26 is a diagram showing another example of a reference signal arrangement at a normal CP and FIG. 27 is a diagram showing another example of a reference signal arrangement at an extended CP. Comparing with the exemplary embodiment of FIGS. 20 and 21, the region in which the reference signals are arranged like the existing RB within the middle guard band is disposed at five subcarrier spacings from carrier #1 and four subcarrier spacings from carrier #2.

In FIGS. 20 to 27, the radio resource allocation unit included in the middle guard band includes 12 subcarriers like the existing RB and the position of the radio resource allocation unit is disposed to be contiguous to the carrier or disposed to be spaced away from the carrier.

Figure 28:
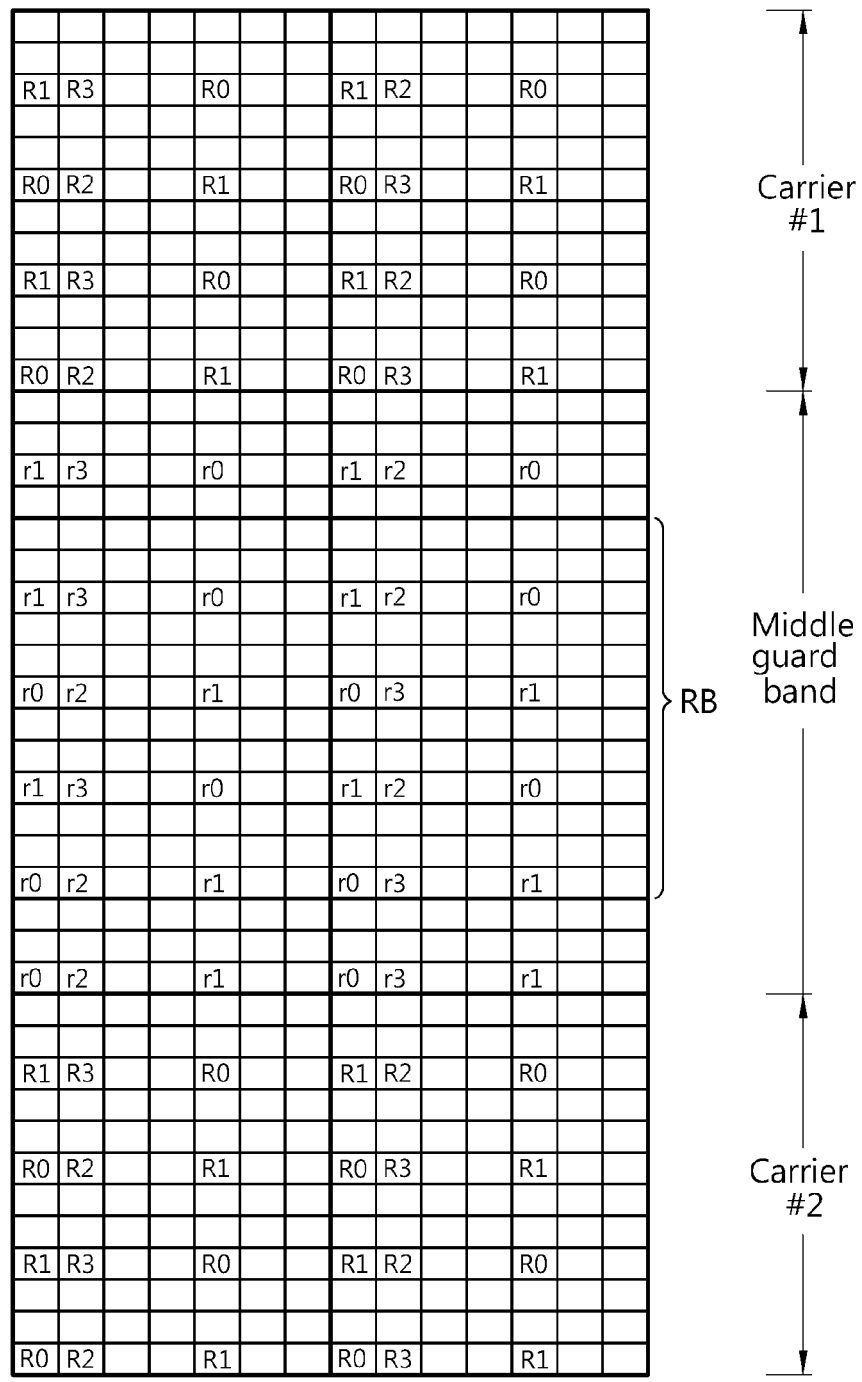
FIG. 28 is a diagram showing another example of a reference signal arrangement at a normal CP and FIG. 29 is a diagram showing another example of a reference signal arrangement at an extended CP.
Figure 29:
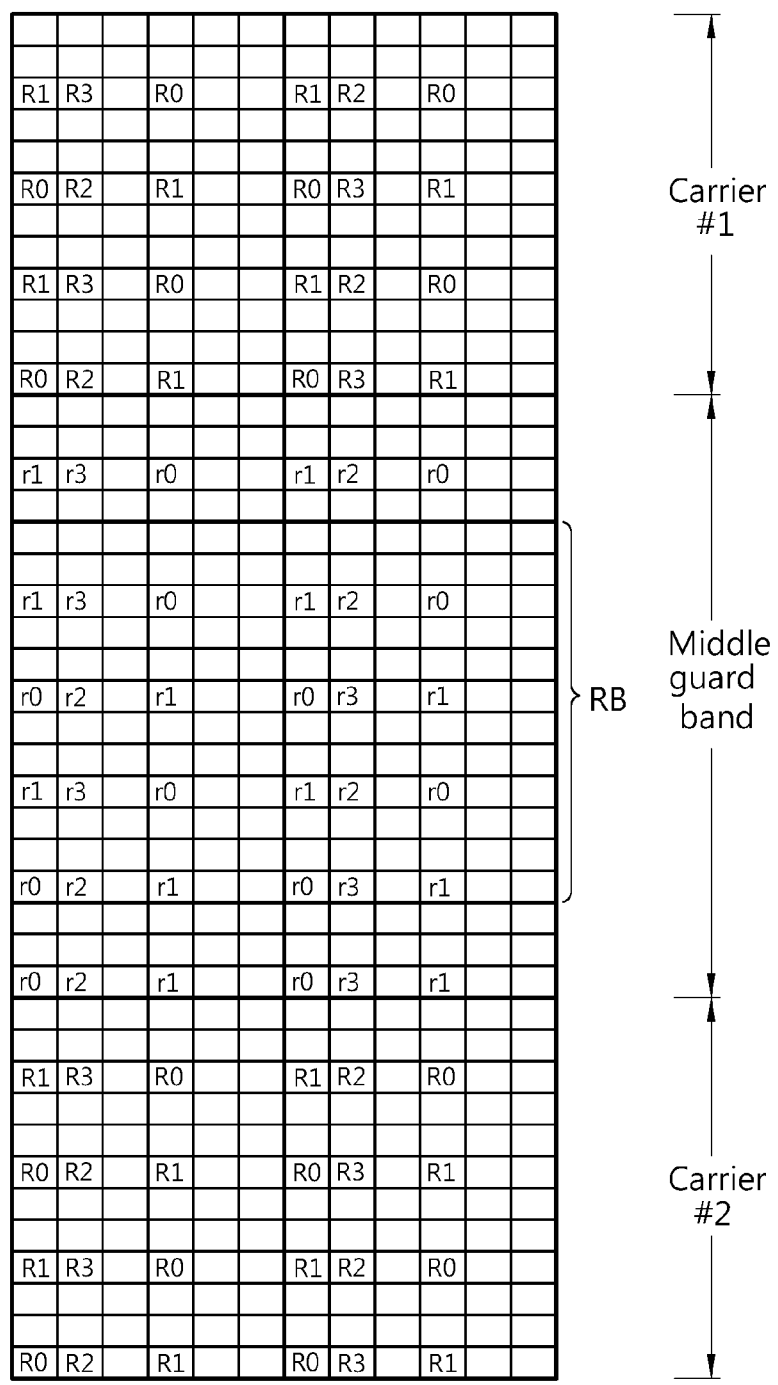

FIG. 28 is a diagram showing another example of a reference signal arrangement at a normal CP and FIG. 29 is a diagram showing another example of a reference signal arrangement at an extended CP. Comparing with the exemplary embodiment of FIGS. 26 and 27, the reference signals that are arranged at a portion of the null subcarriers within the middle guard band is used in order to improve the channel estimation performance of carrier #1 or carrier #2.

Figure 30:
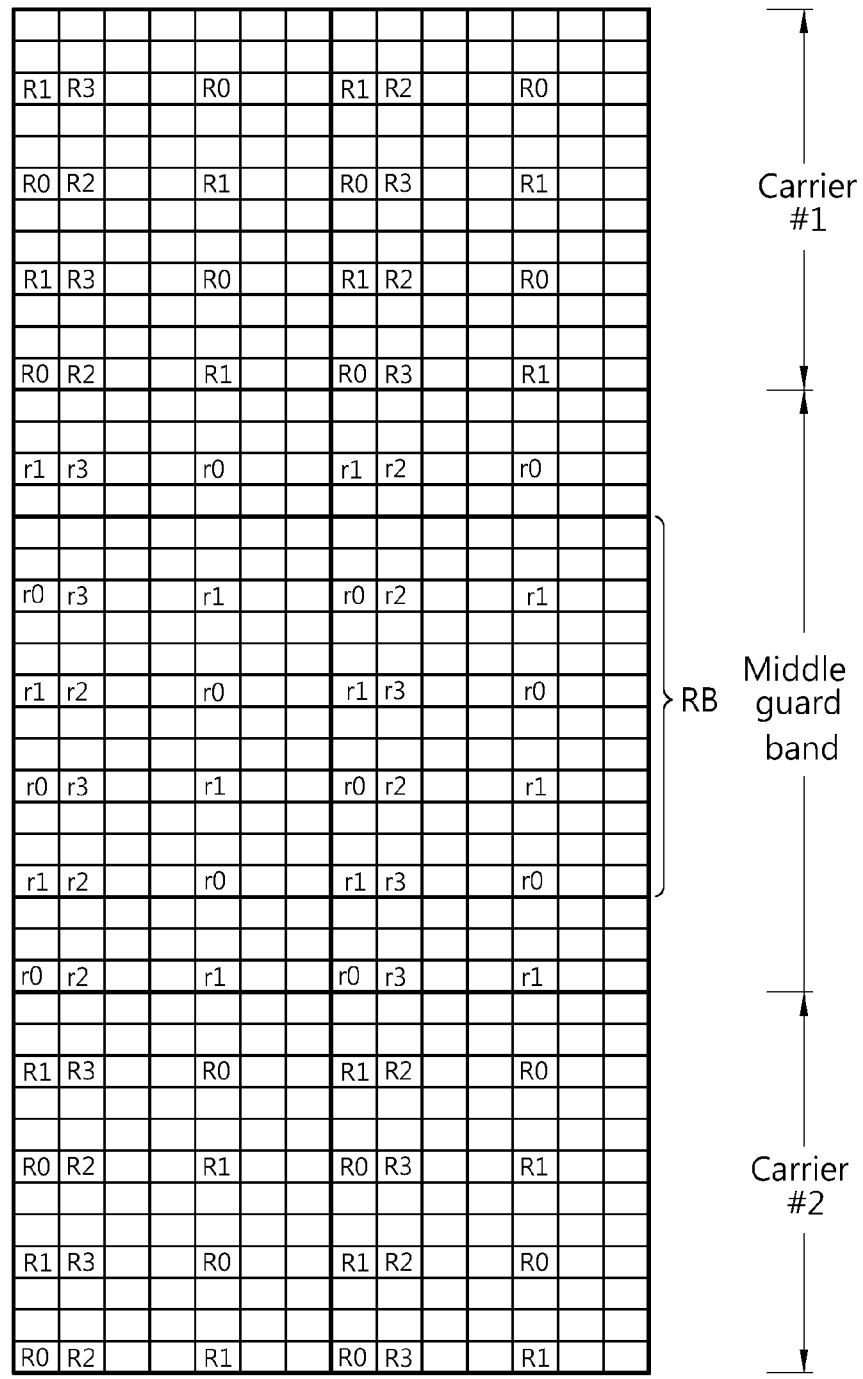
FIG. 30 is a diagram showing another example of a reference signal arrangement at a normal CP and FIG. 31 is a diagram showing another example of a reference signal arrangement at an extended CP.
Figure 31:
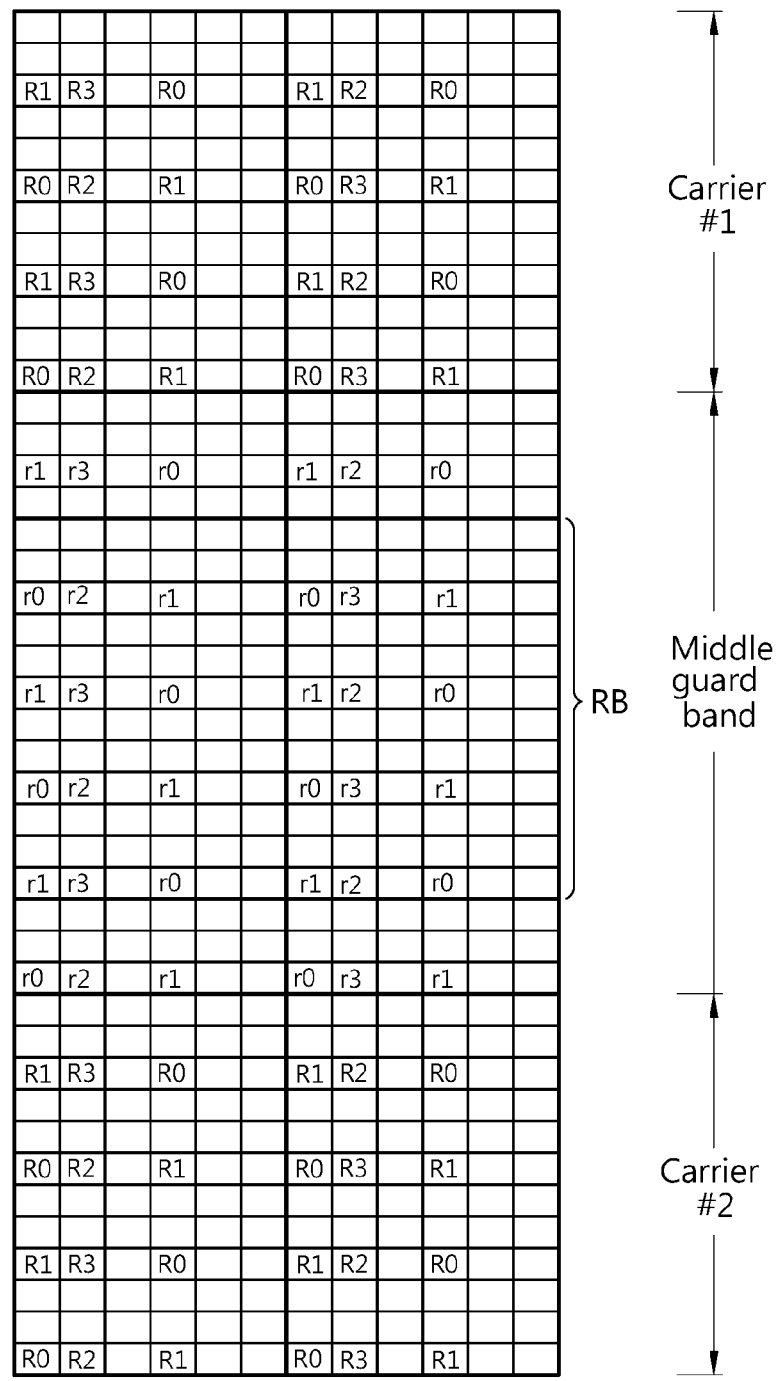

FIG. 30 is a diagram showing another example of a reference signal arrangement at a normal CP and FIG. 31 is a diagram showing another example of a reference signal arrangement at an extended CP. Comparing with the exemplary embodiment of FIGS. 28 and 29, r0 and r1 are switched and r2 and r3 are switched, at the RB within the middle guard band. That is, a diversity effect may be exhibited by differentiating the arrangement method of (R0 and R1), (R2 and R3) in the used band of the carrier and the arrangement method of (r0 and r1), (r2 and r3) within the middle guard band.

The method described in FIGS. 28 to 31 is to arrange the reference signals to improve the channel estimation performance even in the subcarrier that does not configure the RB, when the number of subcarriers included in the middle guard band is larger than 12 but smaller than a multiple number of 12. Extrapolation is applied to the arranged reference signals, together with the reference signals of the carriers, thereby improving the channel estimation performance.

Figure 32:
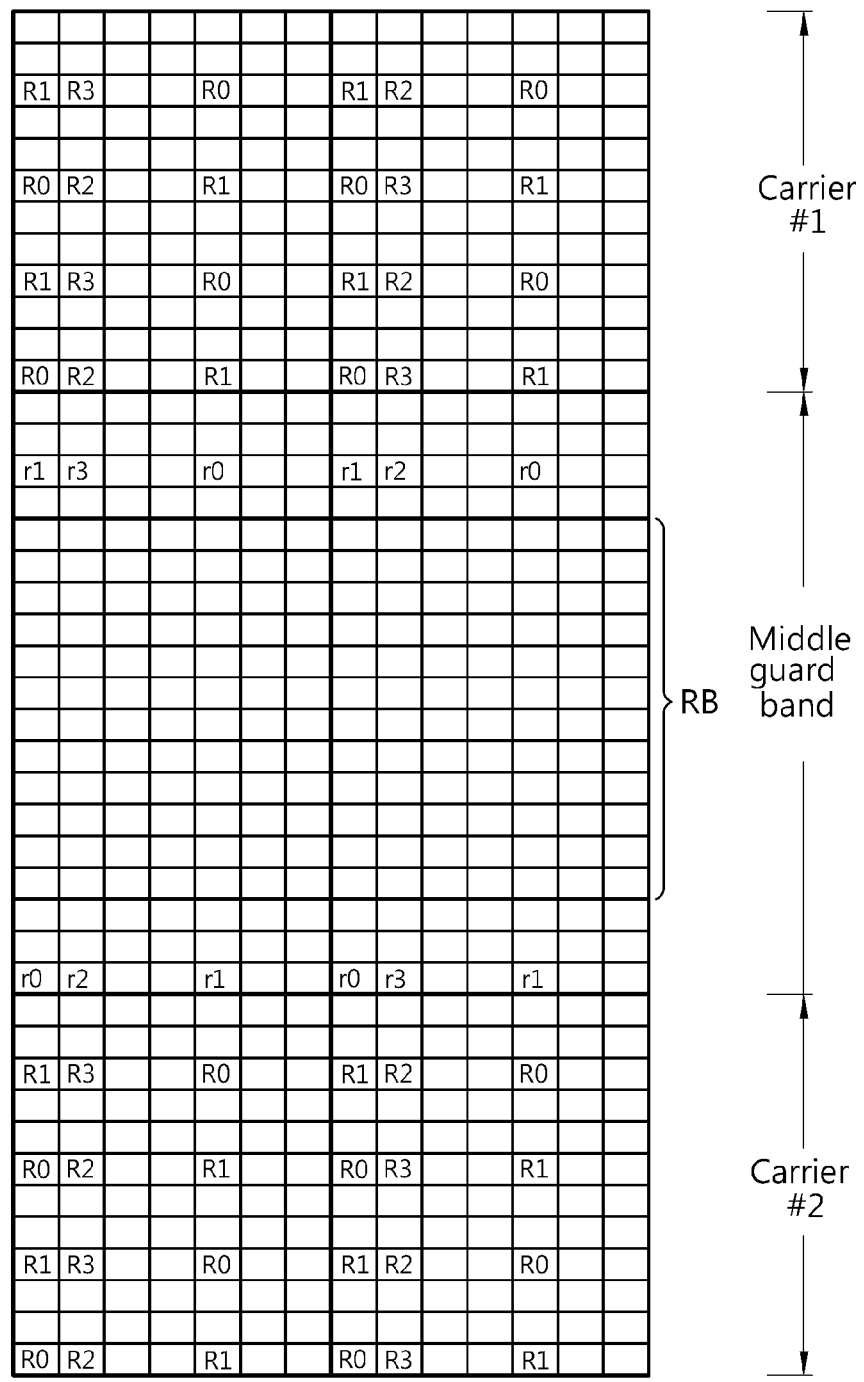
FIG. 32 is a diagram showing another example of a reference signal arrangement at a normal CP and FIG. 33 is a diagram showing another example of a reference signal arrangement at an extended CP.
Figure 33:
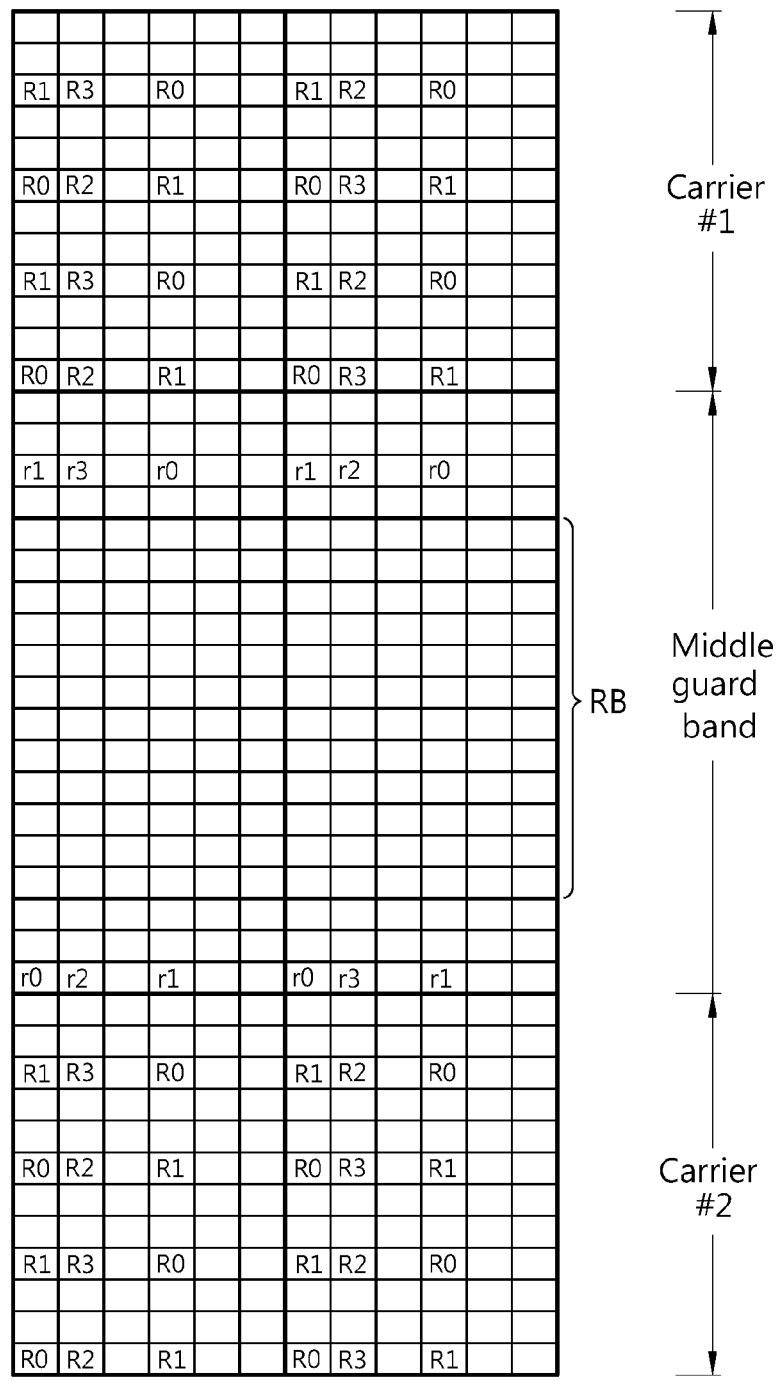

FIG. 32 is a diagram showing another example of a reference signal arrangement at a normal CP and FIG. 33 is a diagram showing another example of a reference signal arrangement at an extended CP. 12 subcarriers positioned at the middle of the middle guard band becomes the null subcarrier and the remaining subcarriers are used to transmit the reference signals and/or the data. That is, a certain of number of continuous subcarriers contiguous to the carrier among the subcarriers included in the middle guard band is used to improve the channel estimation performance of the carrier and the remaining subcarriers are used as the null channel between the carriers.

When a plurality of carriers are aggregated, each of the carriers may be aggregated by a simple combination method. That is, the combination method is a method of arranging the carriers in the frequency domain while maintaining the used band and the guard band of each carrier.

Figure 34:
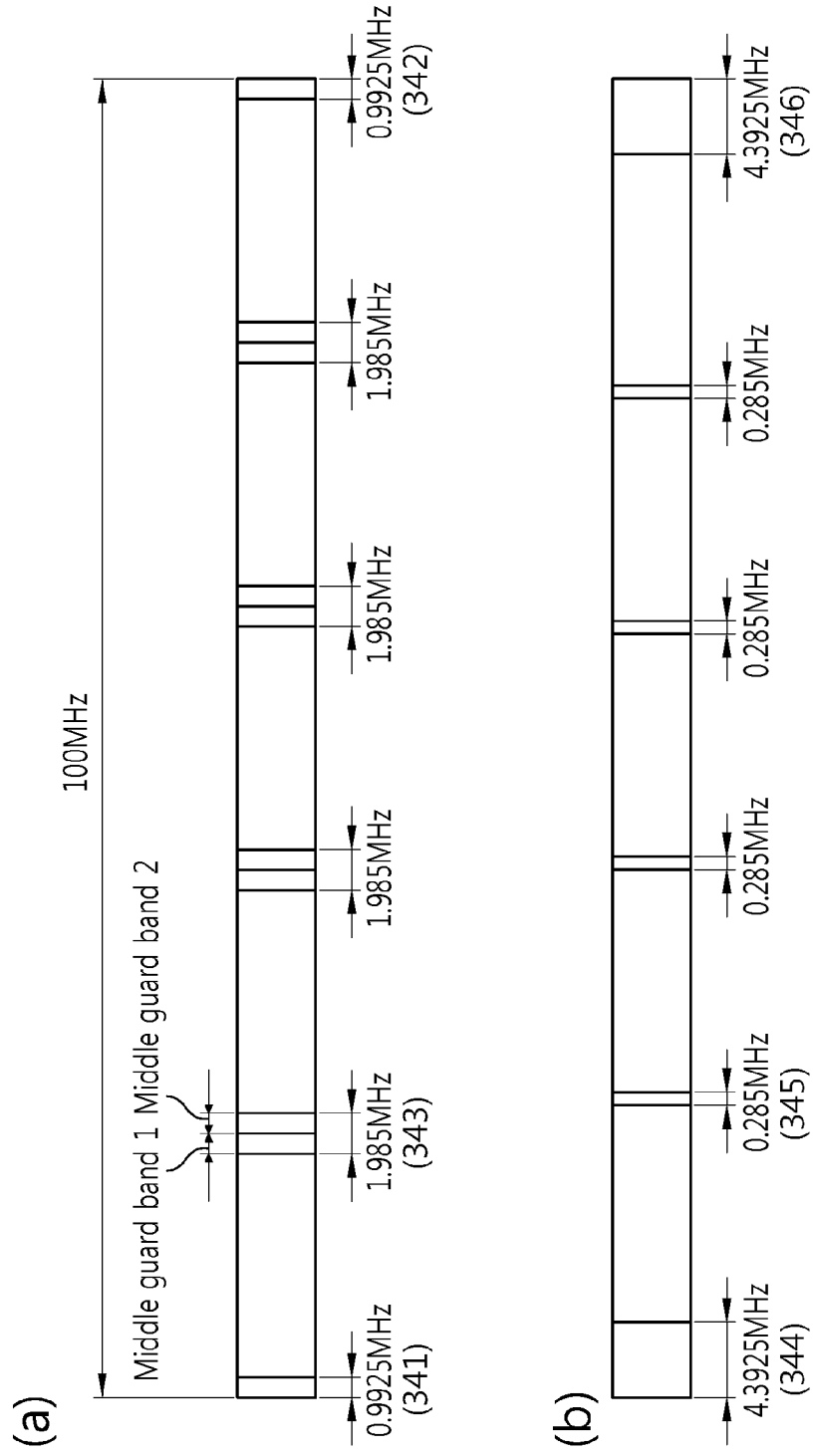
FIG. 34 is a comparative diagram of a method of aggregating carriers by a simple combination of five carriers with a method of using 19 sub-carriers as a middle guard band in order to obtain a 100 kHz frequency raster.

FIG. 34 shows a comparison of a method of aggregating carriers by a simple combination of five carriers and a method of using 19 sub-carriers as the middle guard band in order to obtain a 100 kHz frequency raster.

Referring to FIG. 34 (a), the aggregated carriers having a bandwidth of 100 MHz are formed by simply combining five carriers having a bandwidth of 20 MHz. That is, the used band and the guard band of each subcarrier is maintained. Therefore, a left guard band 341 and a right guard band 342 of the aggregated carriers have 0.9925 MHz and each of the middle guard bands 343 has a bandwidth of 1.985 MHz.

Referring to FIG. 34 (b), each of the middle guard bands 345 of the aggregated carriers is configured of 19 subcarriers and thus, has a bandwidth of 0.285 MHz and a left guard band 344 and a right guard band 346 have a bandwidth of 4.3925 MHz.

Although FIG. 34 shows as an example the case in which five carriers having a bandwidth of 20 MHz are aggregated, it is apparent that the combination of various carriers may be implemented. The following Table 10 indicates the middle guard band and the number of RBs according to the type of carriers.

TABLE 10

| carrier bandwidth(MHz) | 1.4 | 3 | 5 | 10 | 15 | 20 |
|---|---|---|---|---|---|---|
| number of RBs included in used band | 6 | 15 | 25 | 50 | 75 | 100 |
| used band(MHz) | 1.095 | 2.715 | 4.515 | 9.015 | 13.515 | 18.015 |
| number of subcarriers included in used band | 73 | 181 | 301 | 601 | 901 | 1201 |
| middle guard band 1(or 2) (MHz) | 0.1525 | 0.1425 | 0.2425 | 0.4925 | 0.7425 | 0.9925 |
| number of subcarriers included in middle guard band 1(or 2) | 10.17 | 9.50 | 16.17 | 32.83 | 49.50 | 66.17 |
| number of RBs included in middle guard band 1(or 2) | 0.85 | 0.79 | 1.35 | 2.74 | 4.13 | 5.51 |

When the carriers aggregated by simply combining each carrier are configured, if the bandwidths of each carrier are the same, the radio resource allocation unit including 12 subcarriers in the middle guard band may be used, similar to the existing RB. Further, when the subcarriers with the number smaller than the single RB, that is, 12 or less remain, they may be used as the null channel between the carriers or the channel of the special usage. When the carriers aggregated by simply combining each carrier is configured, the case in which the bandwidths of each carrier are different is also applied similarly. In addition, even when the magnitude of the left guard band and the right guard band is different, a method of using the middle guard band may be similarly applied. When the carriers aggregated by simply combining each carriers is configured, inverse fast Fourier transform (IFFT) is performed on each carrier.

Figure 35:
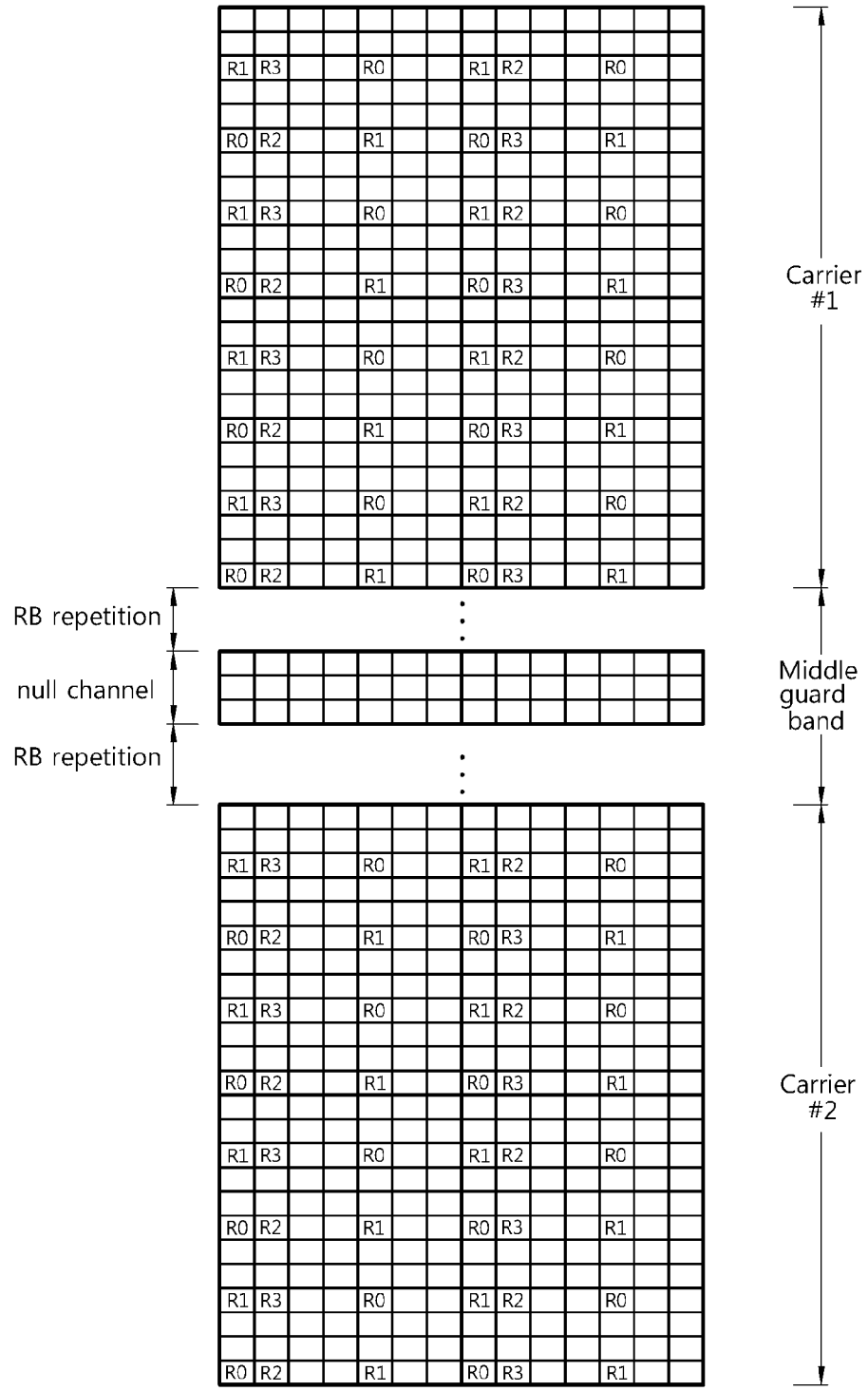
FIG. 35 is a diagram showing an example of the reference signal arrangement in the middle guard band at a normal CP at the time of forming carriers aggregated by a simple combination of a plurality of carriers and FIG. 36 is a diagram showing an example of the reference signal arrangement at an extended CP.
Figure 36:
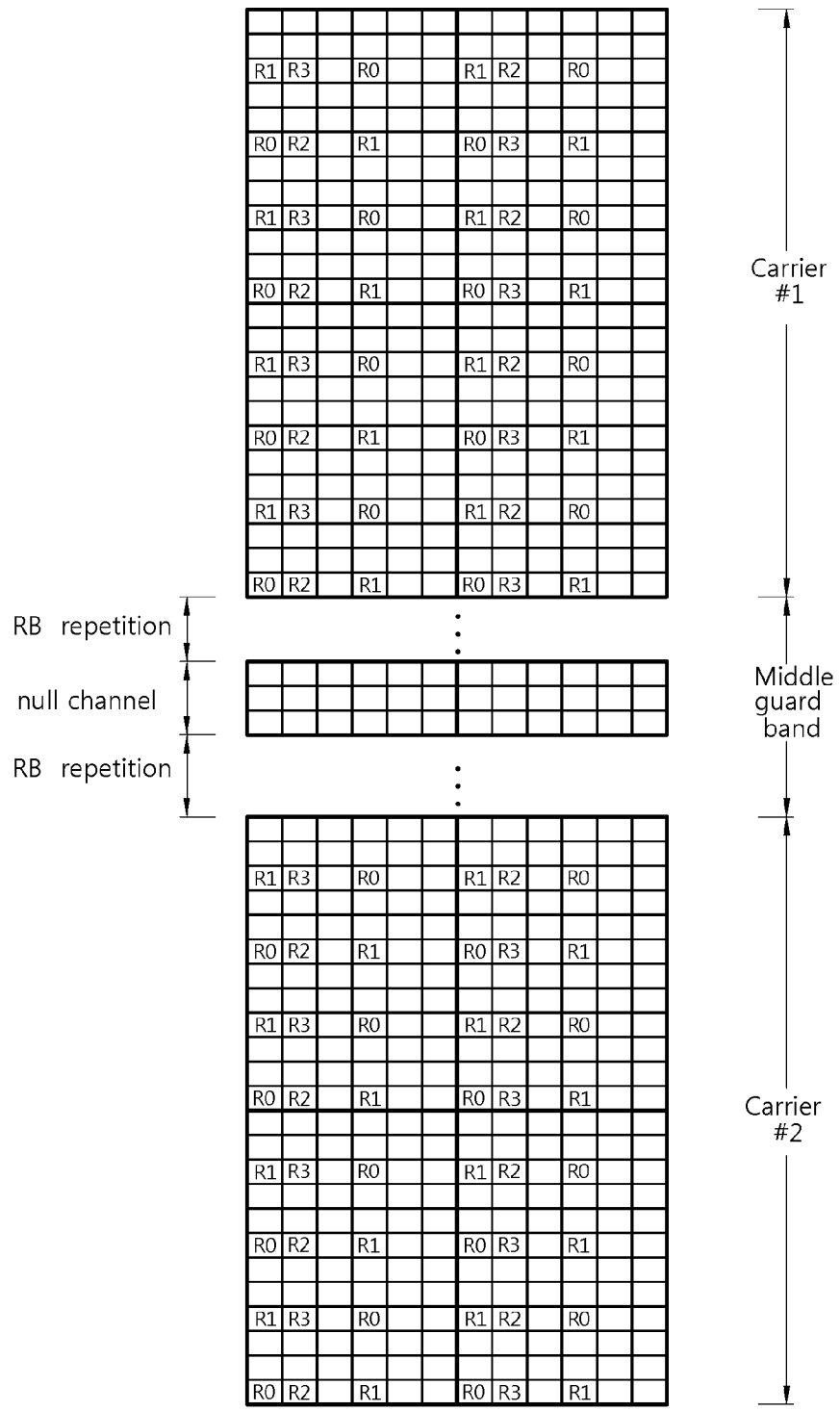

FIG. 35 is a diagram showing an example of the reference signal arrangement in the middle guard band at a normal CP at the time of forming carriers aggregated by a simple combination of the plurality of carriers and FIG. 36 is a diagram showing an example of the reference signal arrangement at an extended CP.

In FIGS. 35 and 36, the radio resources are allocated based on as a unit the RB including 12 subcarriers with the beginning of the subcarriers contiguous to the carriers in the middle guard band and the subcarriers with the number smaller than 12 may be used as the null channel.

Hereinafter, when the bandwidth of the carriers is 20 MHz, the case in which the maximum number of RBs configuring the used band is 110 is considered.

When the maximum number of RBs configuring the used band is 110, the method of simply combining the plurality of carriers may not match the frequency raster with 100 kHz. That is, the central frequency of the carrier may not match with multiples of 100 KHz. In order to solve this, there is a method of inserting 19 subcarriers into the middle guard band at the aggregated carrier.

The following Table 11 indicates the magnitude and % ratio of the guard band when 19 subcarriers are inserted into the middle guard band.

TABLE 11

| BANDWIDTH OF AGGREGATED CARRIER (MHz) | NUMBER OF CARRIERS | OCCUPIED BAND (MHz) | SUM OF MIDDLE GUARD BAND (MHz) | LEFT/RIGHT GUARD BAND (MHz) | PERCENTAGE OF LEFT AND RIGHT GUARD BAND (%) |
|---|---|---|---|---|---|
| 20 | 1 | 19.815 | 0 | 0.0925 | 0.46 |
| 40 | 2 | 39.63 | 0.285 | 0.0425 | 0.11 |
| 60 | 3 | 59.445 | 0.57 | −0.0075 | −0.01 |
| 80 | 4 | 79.26 | 0.855 | −0.0575 | −0.07 |
| 100 | 5 | 99.075 | 1.14 | −0.1075 | −0.11 |

The method of inserting 19 subcarriers into the middle guard band at the aggregated carriers may cause the problem in the case of filtering the system band due to too low percentage of the left/right guard band when the carriers of two or less are aggregated. Further, when at least three carriers are aggregated, the bandwidth of the aggregated carriers occupies the system band or more, thereby causing the problem in that the left/right guard band is not secured.

A method of solving the above-mentioned problems while matching the central frequency of the carrier with multiples of 100 KHz will be described.

Figure 37:
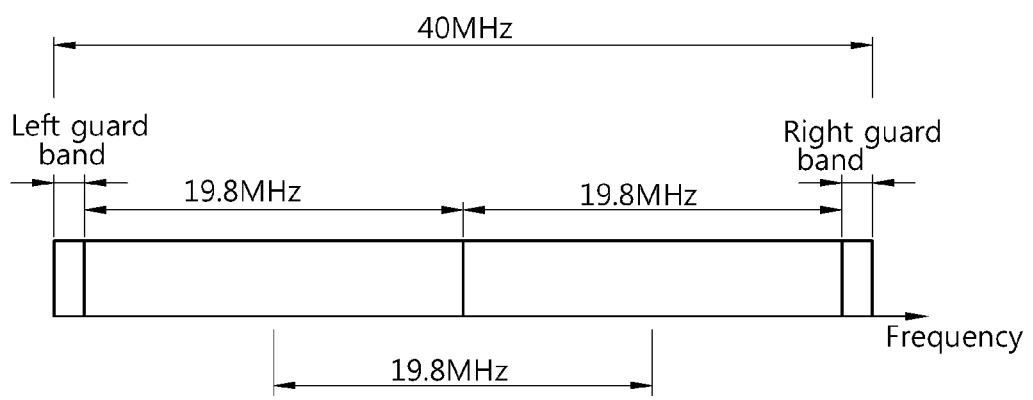
FIG. 37 is a diagram showing the aggregation of two carriers having a frequency band of 20 MHz.

FIG. 37 is a diagram showing the aggregation of two carriers having a frequency band of 20 MHz.

In FIG. 37, the used band is configured as the remaining subcarriers other than the single subcarrier in the used band of each carrier. Further, the middle guard band is not set between the used band of the carrier.

The maximum number of RBs that may be used in the used band at the carrier of 20 MHz is 110 and each RB includes 12 subcarriers. The maximum number of subcarriers that may be used in the used band, including the DC subcarrier, is (110× 12)+1=1321. In this case, this becomes 19.815 MHz when being indicated as the frequency band. When the remaining subcarriers other than the single subcarrier at each carrier are used as the used band (that is, 19.8 MHz) and the middle guard band is not set between the used bands of the carrier, the central frequency of the carrier may match the 100 KHz frequency raster. The magnitude and percentage of the left/right guard band included in the carrier aggregated according to the carrier used in the method are indicated in the following Table 12.

As shown in Table 12, according to the method described with reference to FIG. 37 the percentage of the left/right guard band may be almost constantly maintained.

As described above, a method that removes the single subcarrier for each carrier and does not set the middle guard band between the used bands of the carriers may be appropriate for aggregating the carriers under the condition that 110 RBs are included in the used band of the carrier of 20 MHz and the matching of 100 KHz frequency raster is performed.

Hereinafter, a method that includes an additional guard band in the middle guard band will be described under the condition that 110 RBs are included in the used band of the carrier of 20 MHz and the matching of 100 KHz frequency raster is performed.

Figure 38:
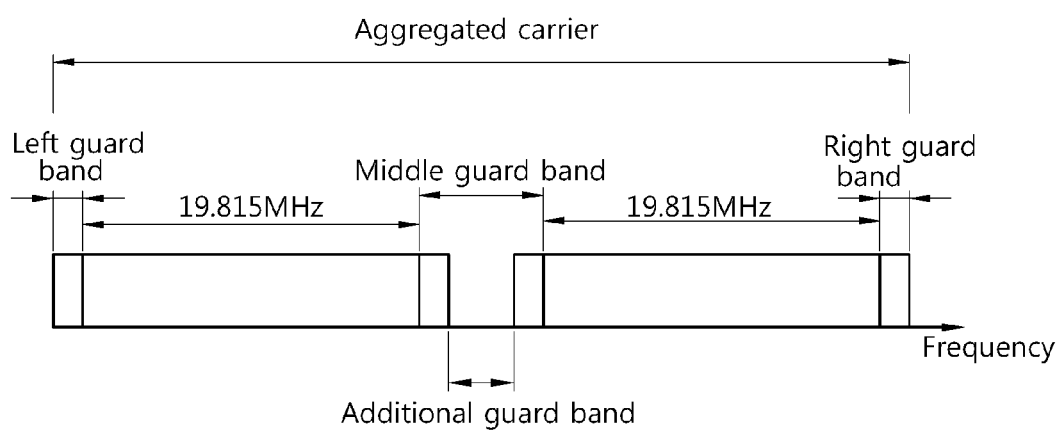
FIG. 38 is a diagram showing an example of the aggregation of two carriers having a frequency band of 20 MHz.

FIG. 38 shows an example of the aggregation of two carriers having a frequency band of 20 MHz.

In FIG. 38, the middle guard band includes the subcarriers such as any one of 19, 39, 59, 79, 99, 119, 139, and 159 and the additional guard band. Since the bandwidth of the aggregated carriers is larger than the system band, the single FFT is performed on the bandwidth of the aggregated carriers in the case in which the radio resources are allocated to the additional guard band. For example, when the system bandwidth is 40 MHz and the bandwidth of the aggregated carriers is 40.1 MHz at the time of configuring the aggregated carriers by aggregating two carriers of 20 MHz, the single FFT is performed on 40.1 MHz.

The following Table 13 indicates the bandwidth of the middle guard band and the bandwidth of the additional guard band when two carriers having the bandwidth of 20 MHz are aggregated.

TABLE 12

| bandwidth of aggregated carrier (MHz) | number of carrier | occupied band (MHz) | total number of subcarrier to be removed | left/right guard band (MHz) | percentage of left/right guard band (%) |
|---|---|---|---|---|---|
| 20 | 1 | 19.815 | 0 | 0.0925 | 0.46 |
| 40 | 2 | 39.63 | 2 | 0.2 | 0.50 |
| 60 | 3 | 59.445 | 3 | 0.3 | 0.50 |
| 80 | 4 | 79.26 | 4 | 0.4 | 0.50 |
| 100 | 5 | 99.075 | 5 | 0.5 | 0.50 |

TABLE 13

| BANDWIDTH OF AGGREGATED CARRIER (MHz) | NUMBER OF SUBCARRIERS INCLUDED IN MIDDLE GUARD BAND | MIDDLE GUARD BAND (MHz) | ADDITIONAL GUARD BAND (MHz) |
|---|---|---|---|
| 40.1 | 19 | 0.285 | 0.1 |
| 40.4 | 39 | 0.585 | 0.4 |
| 40.7 | 59 | 0.885 | 0.7 |
| 41 | 79 | 1.185 | 1 |
| 41.3 | 99 | 1.485 | 1.3 |
| 41.6 | 119 | 1.785 | 1.6 |
| 41.9 | 139 | 2.085 | 1.9 |
| 42.2 | 159 | 2.385 | 2.2 |

The following Table 14 indicates the bandwidth of the middle guard band and the bandwidth of the additional guard band when three carriers having the bandwidth of 20 MHz are aggregated.

TABLE 14

| BANDWIDTH OF AGGREGATED CARRIER (MHz) | NUMBER OF SUBCARRIERS INCLUDED IN MIDDLE GUARD BAND | MIDDLE GUARD BAND (MHz) | ADDITIONAL GUARD BAND (MHz) |
|---|---|---|---|
| 60.1 | 19 | 0.285 | 0.1 |
| 60.4 | 39 | 0.585 | 0.4 |
| 60.7 | 59 | 0.885 | 0.7 |
| 61 | 79 | 1.185 | 1 |
| 61.3 | 99 | 1.485 | 1.3 |
| 61.6 | 119 | 1.785 | 1.6 |
| 61.9 | 139 | 2.085 | 1.9 |
| 62.2 | 159 | 2.385 | 2.2 |

The following Table 15 indicates the bandwidth of the middle guard band and the bandwidth of the additional guard band when four carriers having the bandwidth of 20 MHz are aggregated.

TABLE 15

| BANDWIDTH OF AGGREGATED CARRIER (MHz) | NUMBER OF SUBCARRIERS INCLUDED IN MIDDLE GUARD BAND | MIDDLE GUARD BAND (MHz) | ADDITIONAL GUARD BAND (MHz) |
|---|---|---|---|
| 80.1 | 19 | 0.285 | 0.1 |
| 80.4 | 39 | 0.585 | 0.4 |
| 80.7 | 59 | 0.885 | 0.7 |
| 81 | 79 | 1.185 | 1 |
| 81.3 | 99 | 1.485 | 1.3 |
| 81.6 | 119 | 1.785 | 1.6 |
| 81.9 | 139 | 2.085 | 1.9 |
| 82.2 | 159 | 2.385 | 2.2 |

The following Table 16 indicates the bandwidth of the middle guard band and the bandwidth of the additional guard band when five carriers having the bandwidth of 20 MHz are aggregated.

TABLE 16

| BANDWIDTH OF AGGREATED CARRIER (MHz) | NUMBER OF SUBCARRIERS INCLUDED IN MIDDLE GUARD BAND | MIDDLE GUARD BAND (MHz) | ADDITIONAL GUARD BAND (MHz) |
|---|---|---|---|
| 100.1 | 19 | 0.285 | 0.1 |
| 100.4 | 39 | 0.585 | 0.4 |

TABLE 16-continued

| BANDWIDTH OF AGGREATED CARRIER (MHz) | NUMBER OF SUBCARRIERS INCLUDED IN MIDDLE GUARD BAND | MIDDLE GUARD BAND (MHz) | ADDITIONAL GUARD BAND (MHz) |
|---|---|---|---|
| 100.7 | 59 | 0.885 | 0.7 |
| 101 | 79 | 1.185 | 1 |
| 101.3 | 99 | 1.485 | 1.3 |
| 101.6 | 119 | 1.785 | 1.6 |
| 101.9 | 139 | 2.085 | 1.9 |
| 102.2 | 159 | 2.385 | 2.2 |

The method of allocating the reference signals described with reference to FIGS. 20 to 33 or FIGS. 35 and 36 may be applied to the middle guard band shown in Tables 13 to 16. However, in this case, there is a difference in that the single FFT is performed on the aggregated carrier bandwidth.

Figure 39:
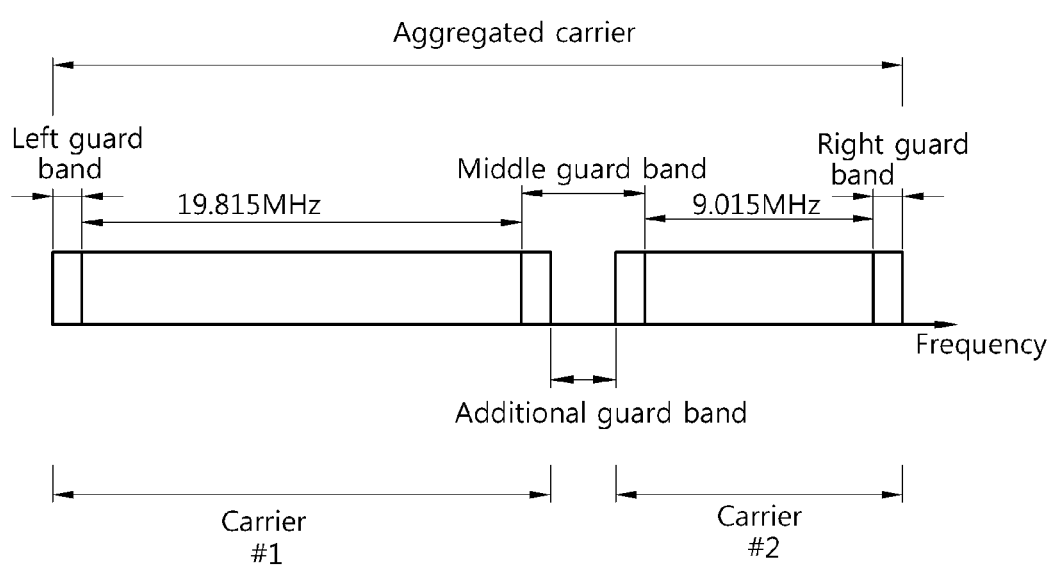
FIG. 39 is a diagram showing an example of the aggregation of carriers having different bandwidths.

FIG. 39 shows an example of the carrier aggregation having different bandwidths.

In FIG. 39, carrier #1 has a bandwidth of 20 MHz and carrier #2 has a bandwidth of 10 MHz. When carrier #1 uses 110 RBs in the used band, the additional guard band inserted into the middle guard band is increased to multiples of 300 KHz. This is to match the frequency raster of 100 KHz and the subscriber spacing of 15 KHz.

Unlike FIG. 39, the additional guard band may not be included in the middle guard band. When the left guard band and the right guard band are allocated with the same number of subcarriers, only 39 subcarriers may be allocated to the middle guard band. Thereafter, the total bandwidth of the aggregated carriers becomes 30 MHz to perform the single FFT on the aggregated carrier. The method of allocating the reference signals described with reference to FIGS. 20 to 33 or FIGS. 35 to 36 may be similarly applied to the middle guard band.

Figure 40:
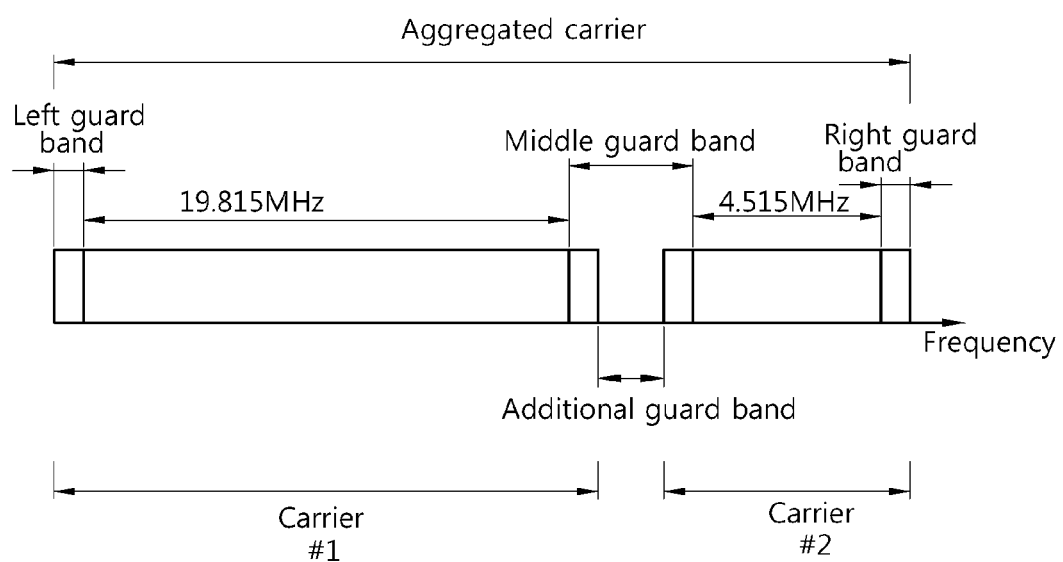
FIG. 40 is a diagram showing another example of the aggregation of carriers having different bandwidths.

FIG. 40 shows another example of the carrier aggregation having different bandwidths.

In FIG. 40, carrier #1 has a bandwidth of 20 MHz and carrier #2 has a bandwidth of 5 MHz. When carrier #1 uses 110 RB in the used band, the middle guard band may include (29+20 k) (k is 0 or larger integer) subcarriers. The additional guard band inserted into the middle guard band is increased based on multiples of 300 KHz as a unit. This is to match the frequency raster of 100 KHz and the subscriber spacing of 15 KHz. The following table 17 indicates an example of the middle guard band and the additional guard band at the time of aggregating the carrier of 20 MHz and the carrier of 5 MHz.

As indicated in Table 17, since the bandwidth of the aggregated carriers is larger than the system bandwidth of 25 MHz, the single FFT is performed on the bandwidth of the aggregated carriers. The method of allocating the reference signals described with reference to FIGS. 20 to 33 or FIGS. 35 and 36 may be applied to the middle guard band indicated in Table 17.

Figure 41:
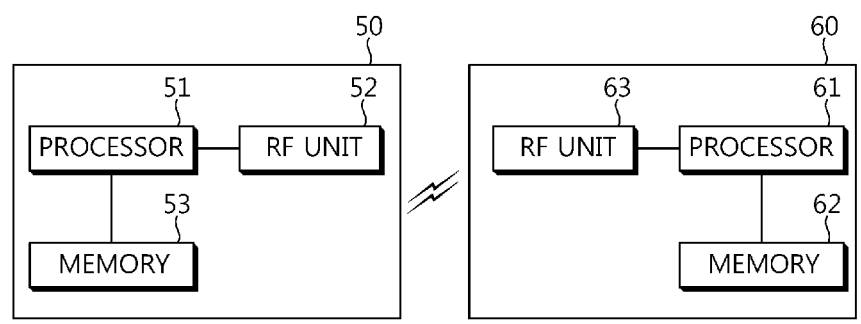
FIG. 41 is a block diagram showing a wireless communication system implementing the exemplary embodiments of the present invention.

FIG. 41 shows a block diagram of a wireless communication system implementing the exemplary embodiments of the present invention. The base station 50 includes a processor 51, a memory 52, and a radio frequency (RF) unit 53. The processor 51 implements the proposed function, process, and/or method. The multi-carrier function may be implemented by the processor 51. The memory 52 is connected to the processor 51 to store various pieces of information for driving the processor 51. The RF unit 53 is connected to the processor 51 to transmit and/or receive the radio signal.

The user equipment 60 includes a processor 61, a memory 62, and an RF unit 63. The processor 61 implements the proposed function, process, and/or method. The multi-carrier function may be implemented by the processor 61. The memory 62 is connected to the processor 61 to store various pieces of information for driving the processor 61. The RF unit 63 is connected to the processor 61 to transmit and/or receive the radio signal.

The processors 51 and 61 may include an application-specific integrated circuit (ASIC), other chipsets, a logical circuit, and/or a data processing apparatus. The memories 52 and 62 may include a read-only memory (ROM), a random access memory (RAM), a flash memory, a memory card, a storage medium, and/or other storage devices. The RF units 53 and 63 may include a baseband circuit for processing the radio signal. When the exemplary embodiment is implemented by software, the above-mentioned method may be implemented by the module (process, function, or the like) that performs the above-mentioned function. The module is stored in the memories 52 and 62 and may be performed by

TABLE 17

| MIDDLE GUARD BAND (MHz) | NUMBER OF SUBCARRIERS INCLUDED IN MIDDLE GUARD BAND | ADDITIONAL GUARD BAND (MHz) | BANDWIDTH OF AGGREGATED CARRIER (MHz) | SPACING BETWEEN CENTRAL FREQUENCIES OF CARRIER (MHz) |
|---|---|---|---|---|
| 0.435 | 29 | 0.1 | 25.1 | 12.6 |
| 0.735 | 49 | 0.4 | 25.4 | 12.9 |
| 1.035 | 69 | 0.7 | 25.7 | 13.2 |
| 1.335 | 89 | 1.0 | 26.0 | 13.5. |
| 1.635 | 109 | 1.3 | 26.3 | 13.8 |
| 2.085 | 139 | 1.6 | 26.6 | 14.1 |
| 2.385 | 159 | 1.9 | 26.9 | 14.4 |
| 2.685 | 179 | 2.2 | 27.2 | 14.7 | the processors 51 and 61. The memories 52 and 62 may be in or out of the processors 51 and 61 and may be connected to the processors 51 and 61 by a widely known various units.

In the above-mentioned exemplified system, although the methods are described based on a flow chart as a series of steps or blocks, the exemplary embodiment of the present invention is not limited to a sequence of steps but any step may be generated in a different sequence or simultaneously from or with other steps as described above. Further, it can be appreciated by those skilled in the art that steps shown in a flow chart is non-exclusive and therefore, include other steps or deletes one or more steps of a flow chart without having an effect on the scope of the exemplary embodiment of the present invention.

Although the exemplary embodiments of the present invention have been described, it may be appreciated by those skilled in the art that various modifications and change can be made without departing from the spirit and scope of the appended claims of the present invention. Therefore, the future change in the embodiments of the present invention can not depart from the technology of the present invention.

The invention claimed is:

1. A communication method in a multi-carrier system, the method comprising:
   determining a size of a special resource block (SRB), wherein the SRB is a resource allocation unit of a middle guard band;
   allocating the SRB to the middle guard band; and
   transmitting the signals through the SRB,
   wherein the middle guard band is a frequency band positioned between used bands of a plurality of carriers, respectively, within an aggregated carrier formed by aggregating the plurality of carriers; and
   wherein the size of the SRB is determined based on whether the bandwidths of the plurality of carriers are the same as each other,
   wherein the size of the SRB is 19 subcarriers in the frequency domain when the bandwidths of the plurality of carriers are the same as each other, and
   the size of the SRB is 9 subcarriers in the frequency domain when the bandwidths of the plurality of carriers are different from each other.

2. The communication method of claim 1, wherein a spacing between the central frequencies of the plurality of carriers, respectively, is multiples of 100 KHz.

3. The communication method of claim 1, wherein the SRB is divided into two regions in the frequency domain and reference signals to estimate a channel of contiguous carriers are arranged in each of the divided region.

4. The communication method of claim 3, wherein when the SRB includes 19 subcarriers, a single divided region has 9 or 10 subcarriers.

5. The communication method of claim 1, wherein when a plurality of SRBs are included in the middle guard band, a reference signal allocated to the middle guard band is allocated based on at least two SRBs as a unit.

6. The communication method of claim 1, wherein reference signals transmitted in the middle guard band have the same time spacing and frequency spacing as reference signals used in the used bands of the carriers.

7. The communication method of claim 1, wherein reference signals transmitted in the middle guard band have the same frequency spacing as reference signals used in the used band of the carriers only in some of the OFDM symbols of the middle guard band.

8. A user equipment (UE), comprising:
   a radio frequency (RF) unit that transmits and receives radio signals; and
   a processor that is connected to the RF unit,
   wherein the processor receives signals through a special resource block (SRB) in a middle guard band and performs channel estimation of carriers based on the signals, the middle guard band being a frequency band positioned between used bands of a plurality of carriers, respectively, within an aggregated carrier formed by aggregating the plurality of carriers, and
   wherein a size of the SRB is determined based on whether the bandwidths of the plurality of carriers are the same as each other, wherein the size of the SRB is 19 subcarriers in the frequency domain when the bandwidths of the plurality of carriers are the same as each other, and the size of the SRB is 9 subcarriers in the frequency domain when the bandwidths of the plurality of carriers are different from each other.

* * * * *